(12) United States Patent
Fan Jiang et al.

(10) Patent No.: US 7,728,930 B2
(45) Date of Patent: Jun. 1, 2010

(54) DISPLAY PANEL, ELECTRO-OPTICAL DEVICE, AND METHODS FOR FABRICATING THE SAME

(75) Inventors: Shih-Chyuan Fan Jiang, Hsinchu (TW); Ching-Huan Lin, Hsinchu (TW); Chih-Ming Chang, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 280 days.

(21) Appl. No.: 12/105,799

(22) Filed: Apr. 18, 2008

(65) Prior Publication Data
US 2008/0316402 A1 Dec. 25, 2008

(30) Foreign Application Priority Data
Jun. 20, 2007 (TW) .............................. 96122036 A

(51) Int. Cl.
G02F 1/1343 (2006.01)
G02F 1/1335 (2006.01)
G02F 1/1368 (2006.01)
G02F 1/139 (2006.01)

(52) U.S. Cl. ....................... 349/114; 349/129; 349/139; 349/156; 349/187

(58) Field of Classification Search ................. 349/113, 349/114, 128, 129, 130, 139, 156, 187; 345/87, 345/88, 92; 257/59, 72; 438/30; 445/24, 445/25

See application file for complete search history.

(56) References Cited

U.S. PATENT DOCUMENTS

| | | | |
|---|---|---|---|
| 6,819,385 B2 | 11/2004 | Lu | |
| 7,002,652 B2 | 2/2006 | Wen et al. | |
| 7,119,761 B2 | 10/2006 | Shen et al. | |
| 2004/0239846 A1 | 12/2004 | Wen et al. | |
| 2005/0122452 A1 | 6/2005 | Yoshida et al. | |
| 2005/0237459 A1 | 10/2005 | Ikeda et al. | |
| 2007/0242009 A1* | 10/2007 | Su | 345/87 |

* cited by examiner

*Primary Examiner*—Dung T Nguyen
*Assistant Examiner*—Tai Duong
(74) *Attorney, Agent, or Firm*—Thomas, Kayden, Horstemeyer & Risley

(57) ABSTRACT

A display panel and an electro-optical device thereof are provided. The display panel comprises a pair of substrates, at least one data line, at least three common lines, at least one scan line, at least one switch element, a common electrode, and a display media layer. The pair of substrates comprises a first substrate and a second substrate. The data line and the three common lines are formed on the first substrate. The data line and the common lines interlace to form a plurality of areas. Each of the areas comprises an electrode. The electrodes are connected to each other to form a pixel electrode. The scan line is formed on the first substrate and under an electrode of one of the areas. The switch element is formed under an electrode of one of the areas, and comprises a source connected to the pixel electrode, a drain connected to the data line, and a gate\ connected to the scan line. The common electrode is formed on the second substrate, with a display media layer disposed between the two substrates.

25 Claims, 18 Drawing Sheets

DISPLAY PANEL, ELECTRO-OPTICAL DEVICE, AND METHODS FOR FABRICATING THE SAME

This application claims the benefits of Taiwan Application No. 096122036 filed on Jun. 20, 2007, the contents of which are herein incorporated by reference in their entirety.

BACKGROUND OF THE INVENTION

1. Field of the Invention

The present invention relates to a display panel, an electro-optical device, and a method for fabricating the same and, more particularly, to improve the tilt conditions of the liquid crystal molecules in a display panel which eliminates the dark-state light leakage.

2. Descriptions of the Related Art

With the continuous advancement of technologies, a wide variety of electronic products have become indispensable. Particularly, the display devices play an important role in multimedia electronic products. Among various displays, the thin film transistor liquid crystal displays (TFT-LCDs) have some advantages, such as low power consumption, no radiation, small size, a flat panel profile, high resolution, and stable display quality. As a result, TFT-LCDs are being widely used in place of conventional cathode ray tube (CRT) displays in many electronic products, such as mobile phones, display screens, digital TV sets, and notebook computers.

With the rapid development of technologies related to TFT-LCDs, improvements to the image displaying quality thereof have become targeted in this field. For example, the technology of the multi-domain vertical alignment (MVA) developed by FUJITSU Corporation has extended the viewing angle in the vertical direction to about 120°, which enhanced the viewing angle of LCDs.

An LCD which displays an image in a mode where light from a backlight module is transmitted through a color filter is known as a "transmissive type LCD", in which a substantial portion of the power consumption is attributed to the backlight module. The brighter the LCD display, the more power the backlight module consumes. Moreover, under bright environments, the displayed images are prone to interference from ambient light, which may render the images unclear. In contrast, a reflective type LCD displays an image by reflecting ambient light, which may be consumer less power, but exhibits a poor contrast ratio, a degraded color saturation, and cannot display images clearly in dark conditions. To overcome these problems, the transflective type LCD comes up as a compromise between the transmissive type LCD and the reflective type LCD. Since it uses both backlight and natural light or artificial light, the transflective type LCD is used in many circumstances, and consumes less power than the transmissive type LCD.

Currently, the transflective type LCD with a MVA design has a protrusion disposed in the transmissive area and the reflective area on the side with the color filter. Such a protrusion may change the distribution of the electric field, making liquid crystal molecules tilt towards the protrusion at a pre-tilt angle, i.e., perpendicular to the surface of the protrusion in different directions. With such a protrusion, the multi-domains of liquid crystal molecules can be achieved, which resulting in a wide viewing angle range and further improving the gray-scale inversion problem as found in single-domain cases.

In the prior art designs of LCD pixels, each sub-pixel has only one common line and only one scan line (i.e. a gate line) disposed therein. In this case, a potential on the scan line will go higher than that on the common line when the TFT is switched off in micro-second (μsec). For example, in a low temperature polysilicon (LTPS) technology, a scan line is exposed to an 11 V potential when TFT is switched off in micro-second (μsec), while the common line stays at 0 V A higher electric potential difference between the common line and the scan line tends to cause uneven an electric field distribution on both sides, which may result in different tilt degrees of the liquid crystals and an irregular arrangement of liquid crystals near the scan line, thus leading to a dark-state leakage and degraded contrast ratio.

In summary, the existing TFT-LCDs with the MVA design exhibit an irregular arrangement of liquid crystal molecules when powered on, which may result in a low efficiency of liquid crystal molecules and affect the brightness distribution. Furthermore, there is a dark-state light leakage and degraded contrast ratio, thereby adversely affecting the image displaying quality. Therefore, it is highly desirable in the art to find a way to improve the liquid crystal arrangement, thereby to eliminate light leakage.

SUMMARY OF THE INVENTION

One objective of this invention is to provide an electro-optical device comprising a display panel. The display panel comprises a pair of substrates, at least one data line, at least three common lines, at least one scan line, at least one switch element, a common electrode, and a display media layer. The pair of substrates comprises a first substrate and a second substrate. The data line is formed on the first substrate. The three common lines comprise a first common line, a second common line, and a third common line formed on the first substrate. The common lines are interlaced with the data line to form a plurality of areas, each of which comprises an electrode connected to another electrode in another area to form a pixel electrode. The scan line is formed on the first substrate and disposed under the electrode of one of the areas. The switch element is formed under the electrode of one of the areas, and comprises a source connected to the pixel electrode, a drain connected to the data line, and a gate connected to the scan line. The common electrode is formed on the second substrate. The display media layer is disposed between the pair of the substrates.

Another objective of this invention is to provide a method of fabricating an electro-optical device, comprising a method of fabricating a display panel. The method for a display panel comprises: providing a pair of substrates comprising a first substrate and a second substrate; forming at least one data line on the first substrate; forming at least three common lines on the first substrate, wherein the common lines comprise a first common line, a second common line, and a third common line, and are interlaced with the data line to form a plurality of areas, each of which comprises an electrode connected to another electrode in another area to form a pixel electrode; forming at least one scan line on the first substrate under the electrode of one of the areas; forming at least one switch element under the electrode of one of the areas, wherein the switch element comprises a source connected to the pixel electrode, a drain connected to the data line, and a gate connected to the scan line; forming a common electrode on the second substrate; and disposing a display media layer between the pair of the substrates.

Still another objective of this invention is to provide an electro-optical device comprising a display panel. The display panel comprises: a pair of substrates, each substrate comprising a plurality of areas. The areas have at least one data line and at least three common lines. Each area comprises an electrode connected to another electrode in another area, wherein the common lines comprise a first common line, a second common line, and a third common line. There is at least one scan line under the electrode of one of the areas and a display media layer formed between the pair of the substrates.

Yet a further objective of this invention is to provide a method for fabricating an electro-optical device, which comprises a method for fabricating a display panel. The method for a display panel comprises: providing a pair of substrates with each substrate comprising a plurality of areas. The areas comprise at least one data line and at least three common lines. Each area comprises an electrode connected to one another electrode in another area, wherein the common lines comprise a first common line, a second common line, and a third common line. There is at least one scan line under the electrode of one of the areas. In addition, there is a display media layer between the pair of the substrates.

By using the configuration of scan lines and common lines to change the electric field distribution of a display panel, the display panel and the electro-optical device of this invention achieves a regular arrangement of liquid crystals within the display panel, which may enhance the efficiency of the liquid crystals and improve the dark-state light leakage, thus improving the contrast ratio.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
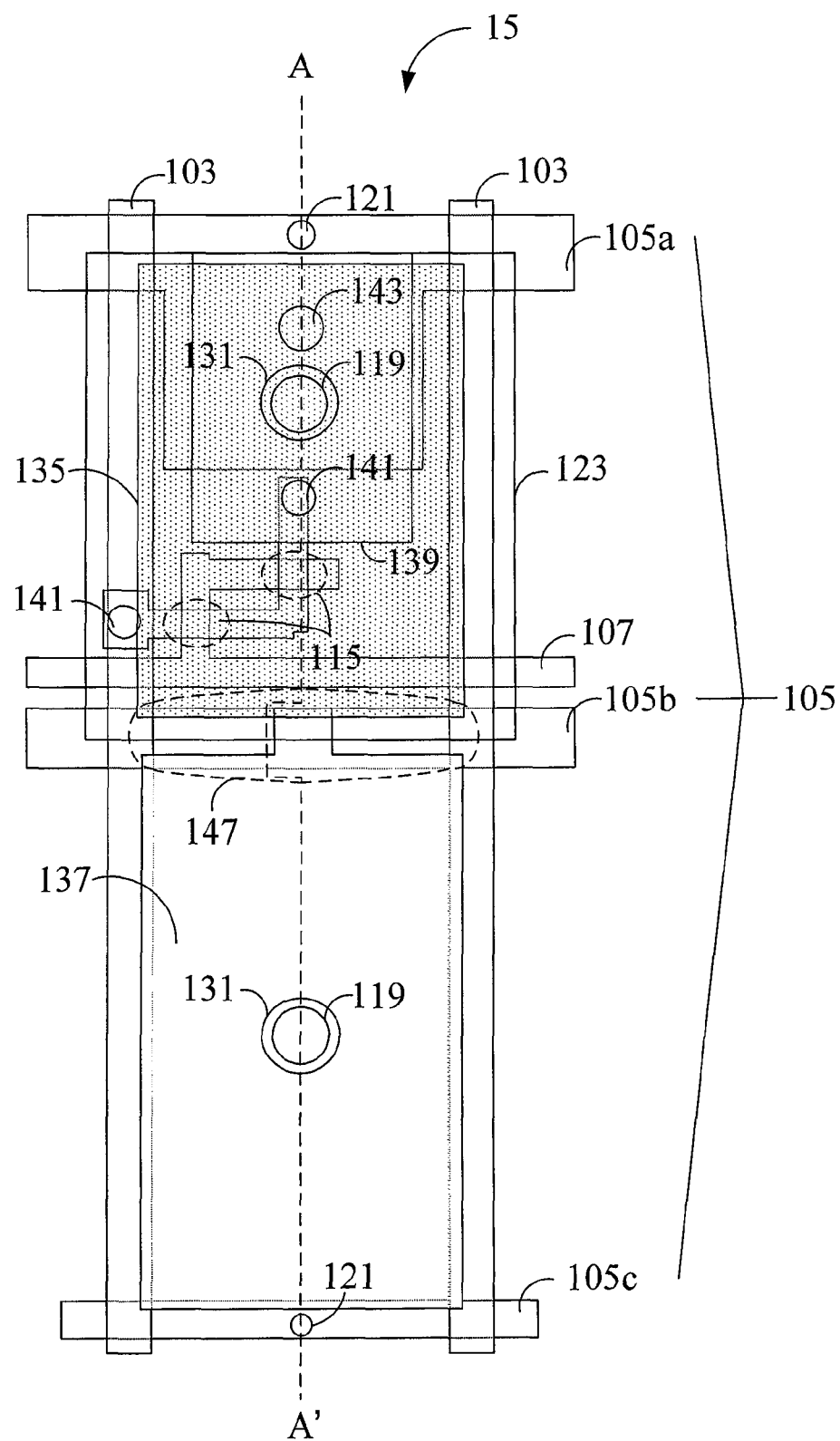
FIG. 1A illustrates a partial top view of a display panel of a first embodiment in accordance with this invention.

A display panel 15 disclosed in a first embodiment of this invention comprises a pair of substrates 101a, 101b, a plurality of data lines 103, a plurality of common lines 105, a plurality of scan lines 107, a first dielectric layer 109, a second dielectric layer 111, a third dielectric layer 113, a switch element 115, a display media layer 117, an alignment element 119, a spacer 121, an organic dielectric layer 123, a common electrode 125, an overcoat 127, a color resist layer 129, and a black matrix (BM) 131. The corresponding relationships of which are depicted in FIGS. 1A and 1B.

Figure 1B:
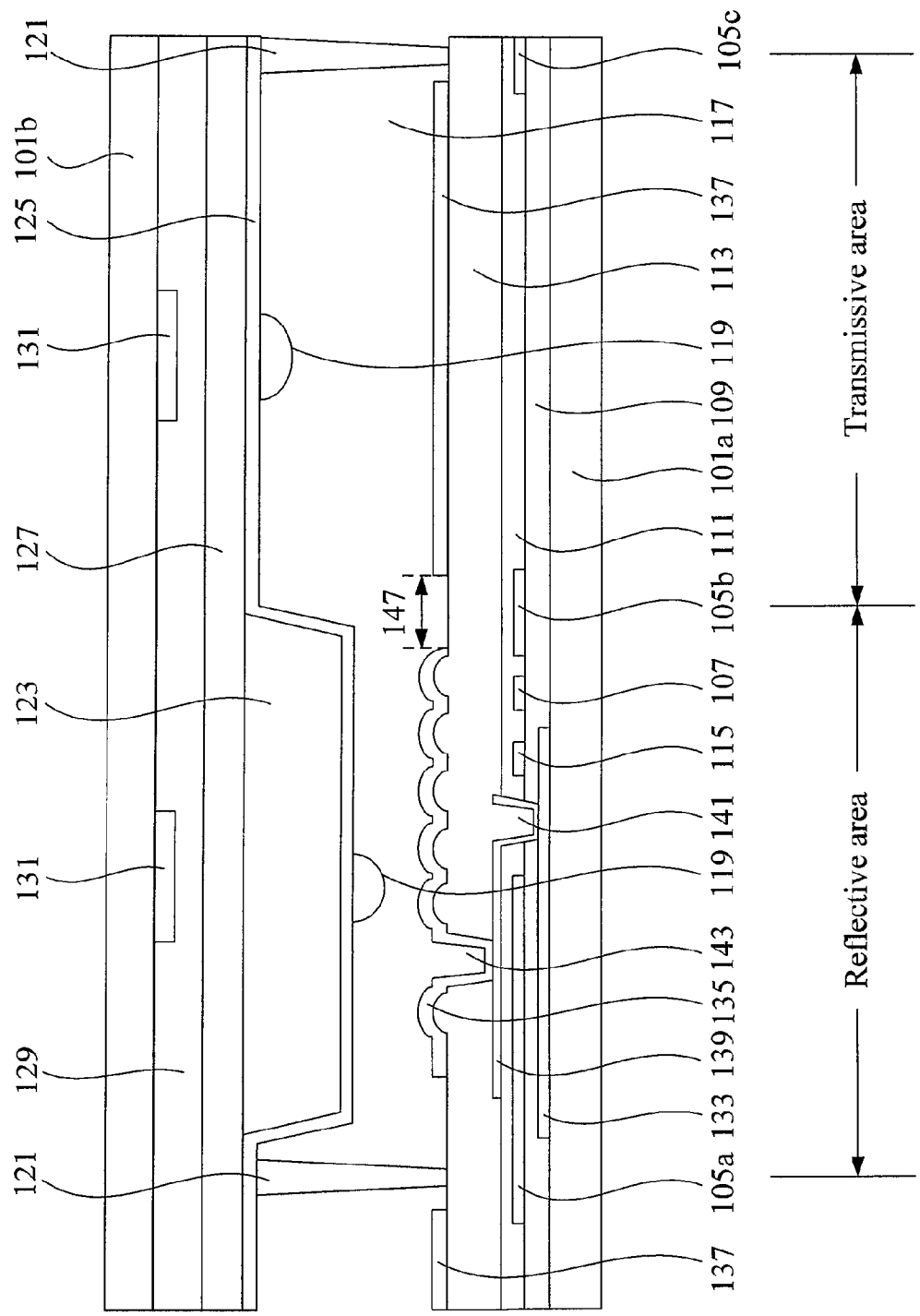
FIG. 1B is a cross-sectional view along line A-A' in FIG. 1A.

As shown in FIG. 1B, the pair of substrates comprises a first substrate 101a and a second substrate 101b. The plurality of data lines 103 (not shown in FIG. 1B) are formed on the first substrate 101a, as are also the plurality of common lines 105a, 105b, 105c. The common lines 105a, 105b, 105c are substantially parallel to the scan lines 107, and interlaced with the data lines 103 to form a plurality of areas.

Although the design architecture of this invention is not limited to the architecture of a transflective type LCD, this architecture will be described as an embodiment in the following description to highlight the advantages of this invention. In the display panel 15, one data line 103 and three common lines 105a, 105b, 105c can interlacedly define two areas, one of which may be a reflective area with an electrode made of a reflective material (called as a reflective electrode 135), and the other of which may be a transmissive area with an electrode made of a transmissive material (called a transparent electrode 137). In other embodiments, the electrodes may be made of a reflective material (also known as an opaque material, e.g., Au, Sn, Cu, Ag, Fe, Pb, Cd, Mo, Hf, Nd, Ti, Ta, other appropriate materials, nitrides thereof, oxides thereof, alloys thereof, or a combination thereof), a transparent material (e.g., Indium Zinc Oxide (IZO), Aluminum Zinc Oxide (AZO), Cadmium Tin Oxide (CTO), Hafnium oxide, other materials, or a combination thereof), or a combination thereof.

In this embodiment, each of the reflective areas forms a sub-pixel with one of its adjacent transmissive areas, and between the transmissive area and the reflective area in each sub-pixel is a first main slit 147. A plurality of sub-pixels of different colors in turn forms a pixel, which is a basic structure for displaying an image in the display panel 15. In other embodiments, a sub-pixel may be formed from identical areas, for example, by the reflective areas or transmissive areas. There is also a main slit that forms between any two adjacent areas, such as the first main slit 147 shown in FIG. 1A. Preferably, the location of the first main slit 147 should correspond to that of the common line 105b, although it is not limited thereto.

In reference to FIG. 1B, both the first dielectric layer 109 and the second dielectric layer 111, which may also be called as insulation layers, are formed on the first substrate 101a for insulation purposes. In this embodiment, the first substrate 101a is located on one side of the first dielectric layer 109, while the second dielectric layer 111 is located on the other side thereof. Interposed partially between the first dielectric layer 109 and the first substrate 101a is a polysilicon layer 133, which is located in the reflective area. Interposed between the first dielectric layer 109 and the second dielectric layer 111 are common lines 105*a*, 105*b*, 105*c*, a switch element 115, a scan line 107, and so on. In addition, the first dielectric layer 109 and the second dielectric layer 111 may be a single layer structure or a multi-layer structure, and may be made of organic materials (e.g., a photoresist, polyarylene ether (PAE), polyamides, polyesters, polyalcohols, polyolefins, benzocyclclobutene (BCB), hydrogen silsesquioxane (HSQ), methyl silsesquioxane (MSQ), SiOC—H, or other materials, or a combination thereof), inorganic materials (e.g., silicon oxide, silicon nitride, silicon oxynitride, silicon carbide, hafnium oxide, or other materials, or a combination thereof), or a combination thereof.

For purposes of description, the three common lines depicted in FIG. 1A are represented by a first common line 105*a*, a second common line 105*b*, and a third common line 105*c*, respectively. The electric potential differences between the common lines are substantially equal to each other, which may be achieved by the electrical parallel connection or by supplying substantially equal potentials. In this embodiment, the reflective area is located between the first common line 105*a* and the second common line 105*b*, while the transmissive area is located between the second common line 105*b* and the third common line 105*c*. In other words, the first common line 105*a* and the third common line 105*c* are the most distant from each other. Additionally, the second common line 105*b* is the closest to the scan line 107, and is disposed on the border between the reflective area and the transmissive area. Preferably, the second common line 105*b* may be made of an opaque material or a reflective material, for example, Au, Sn, Cu, Ag, Fe, Pb, Cd, Mo, Hf, Nd, Ti, Ta, other appropriate materials, nitrides thereof, oxides thereof, alloys thereof, or a combination thereof.

The switch element 115 is located between an electrode of one of these areas and the first substrate 101*a*. In this embodiment, the switch element 115 is formed between the reflective electrode 135 of the reflective area and the first substrate 101*a*, as shown in FIG. 1B. The switch element 115 is a thin film transistor (TFT) of a top gate structure or of a bottom gate structure, which comprises a source, a drain, and a gate (not shown). In the present embodiment, the top gate structure as an exemplification, but not limited it. The source is electrically connected to the reflective electrode portion of the pixel electrode, the drain is electrically connected to the data line 103, and the gate is electrically connected to the scan line 107. For example, in a bottom gate structure (not shown), there may be an insulation layer further disposed above the gate, and the source and the drain lie on the insulation layer. Another insulation layer is in turn disposed above the source and the drain.

A metal layer 139 is formed on a portion of the second dielectric layer 111, and a portion of the metal layer 139 is further formed downwards through a via hole 141 and penetrates through the first dielectric layer 109 and the second dielectric layer 111, so as to connect the polysilicon layer 133. At this point, the metal layer 139 is said to be the drain/source of a TFT.

The third dielectric layer 113 is located above the second dielectric layer 111 and the metal layer 139. The third dielectric layer 113 may be made of an organic material (e.g., a photoresist, polyarylene ether (PAE), polyamides, polyesters, polyalcohols, polyolefins, benzocyclclobutene (BCB), hydrogen silsesquioxane (HSQ), methyl silsesquioxane (MSQ), SiOC—H, or other materials, or a combination thereof), an inorganic material (e.g., silicon oxide, silicon nitride, silicon oxynitride, silicon carbide, hafnium oxide, or other materials, or a combination thereof), or a combination thereof. Alternatively, the third dielectric layer 113 may be a dielectric layer adapted to an ultra high aperture ratio technology, in which case, it may be organic material with a macromolecular is adapted, which features a low dielectric constant and a high light transmissivity for mitigating the influence of the stray current on the pixels.

In reference to FIG. 1A, the reflective electrode 135 and the transparent electrode 137 of the two areas are connected to each other at the first main slit 147 to form a pixel electrode. The scan line 107 is also formed on the first substrate 101*a* under the electrode of either of the areas. In this embodiment, the scan line 107 is formed under the reflective electrode 135 of the reflective area. The reflective electrode 135 comprises a reflective layer which may be a reflecting plate or a reflecting mirror. Preferably, the reflective layer has a rough surface, which may be achieved by forming a rough surface with aluminum bumps (Al bump) or forming a rough surface of the third dielectric layer before forming the reflective layer thereon, thus obtaining a rough surface to reflect light uniformly. As a result, the reflecting efficiency is enhanced. A portion of the reflective layer is formed downwards through a contact hole 143 and penetrates through the third dielectric layer 113, so as to connect the metal layer 139.

The display media layer 117 is disposed above the reflective electrode 135 and the transparent electrode 137. The display media layer 117 comprises a plurality of molecules, which in this embodiment are liquid crystal molecules that can rotate to change their directions under the influence of the pixel electrode.

Alignment elements 119 are formed in these areas, and particularly formed at about the central positions of the reflective area and the transmissive area as the exemplification, such that each sub-pixel has at least two alignment elements 119. The alignment elements 119 may be located all on one side of the same substrate 101*b* or 101*a*, or located alternately on opposite sides of the two substrates 101*a*, 101*b*. The alignment elements 119 may be conventional protrusions, and should be made of organic materials (e.g., a photoresist, polyarylene ether (PAE), polyamides, polyesters, polyalcohols, polyolefins, benzocyclclobutene (BCB), hydrogen silsesquioxane (HSQ), methyl silsesquioxane (MSQ), or other materials, or a combination thereof). However, the alignment elements 119 may also be made of inorganic materials (e.g., silicon oxide, silicon nitride, silicon oxynitride, silicon carbide, hafnium oxide, or other materials, or a combination thereof), or a combination of an organic material and an inorganic material. The alignment elements 119 control the orient of the liquid crystal molecules to obtain a result which is a multi-domain vertical alignment. Consequently, the molecules adjacent to the alignment elements 119 tend to be substantially perpendicular to the surface of the alignment elements 119.

The spacers 121 are formed between the third dielectric layer 113 and the common electrode 125 at locations corresponding to the first common line 105*a* and the third common line 105*c*. In particular, the spacers 121 are formed at the periphery of the areas that have the scan lines 107, which in this embodiment is at the periphery of the reflective areas. The spacers 121 maintain a cell gap between the first substrate 101*a* and the second substrate 101*b* to prevent variation of the liquid crystal response characteristics due to an uneven gap.

Figure 1C:
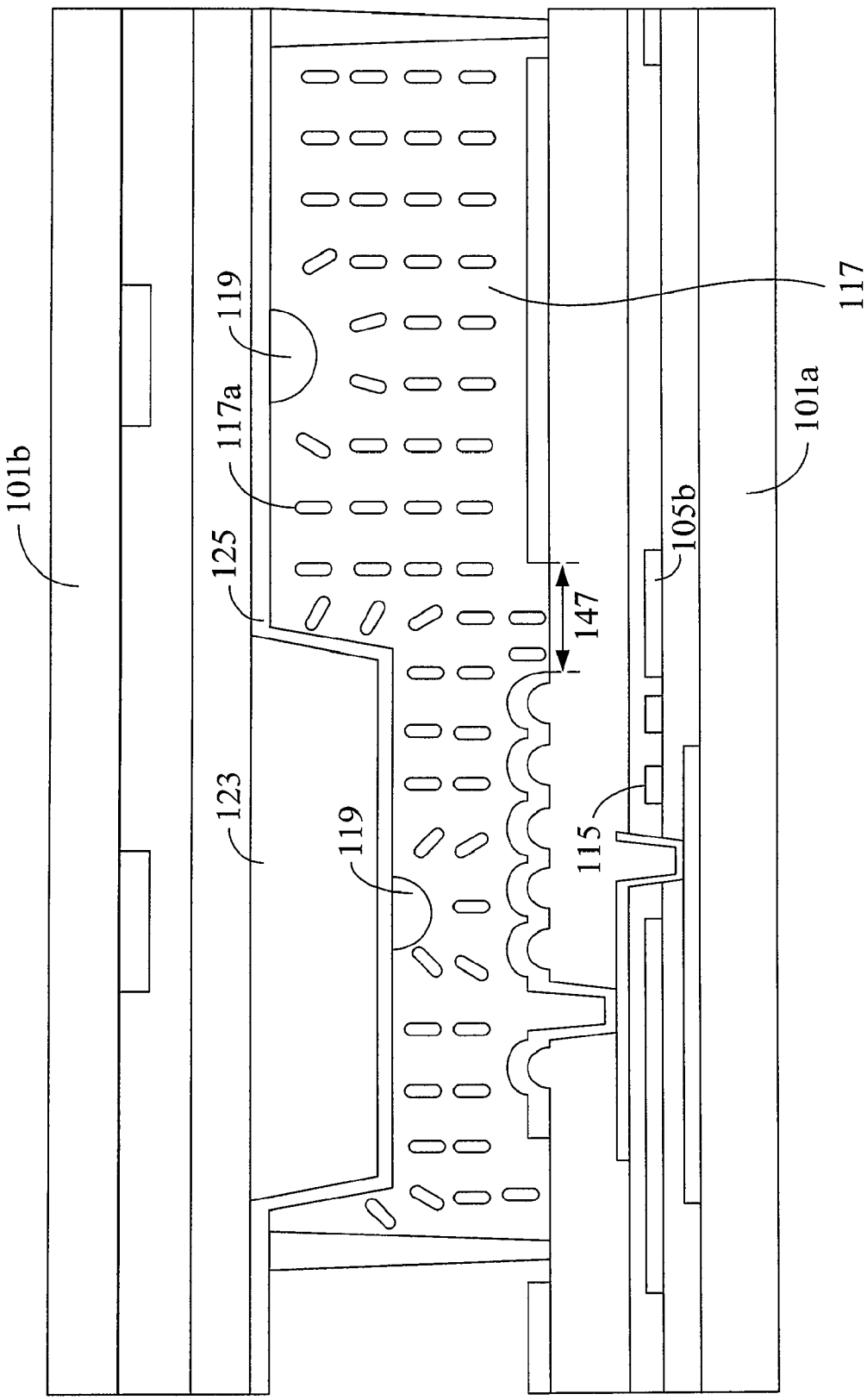
FIG. 1C is a view of the distribution of liquid crystal molecules inside the display panel when the pixel electrodes and the common electrode are deenergized.

In consideration of the transflective characteristic, an organic dielectric layer 123 (e.g., a photoresist, polyarylene ether (PAE), polyamides, polyesters, polyalcohols, polyolefins, benzocyclclobutene (BCB), hydrogen silsesquioxane (HSQ), methyl silsesquioxane (MSQ), or other materials, or a combination thereof) is disposed between the common electrode 125 and the overcoat 127 at locations corresponding to the areas that have the scan lines 107 (i.e. the reflective areas). This position will allow the reflective areas and the transmissive areas to exhibit the same optical path. This technology is commonly called the multi gap on color filter (MOC) technology. The display media layer 117 comprises a lot of molecules, among which the molecules adjacent to the exterior surface of the organic dielectric layer 123 are substantially perpendicular to the exterior surface, while those adjacent to the respective substrates 101a, 101b are substantially perpendicular to the surface of the substrates, as shown in FIG. 1C. A detailed description will be provided hereinafter.

In this embodiment, the common electrode 125 is formed on the side of the second substrate 101b opposite to the first substrate 101a and above the display media layer 117, the alignment elements 119, and the spacers 121. In this embodiment, the common electrode 125 is made of an Indium Tin Oxide (ITO). However, the material is not limited thereto, and may also be made of Indium Zinc Oxide (IZO), Aluminum Zinc Oxide (AZO), Cadmium Tin Oxide (CTO), Hafnium oxide, other materials, or a combination thereof. There are substantially no electric potential differences between the common lines 105a, 105b, 105c, and the common electrode 125.

For example, in the color resist layer 129 on the second substrate 101b, the color resist layer 129 of each sub-pixel is either red, green, or blue. Each pixel in turn comprises sub-pixels of these three colors. However, the colors are not limited thereto. Depending on the specific design requirements, each pixel may also comprise sub-pixels of one color, two colors, four colors, five colors, six colors, seven colors, and so on. In addition to the red, green, and blue colors, the pixels may further comprise black, white (colorless), brown, magenta, jacinth, cyan, or other colors in the color coordinate system (CIE).

The overcoat 127 may be selectively formed between the organic dielectric layer 123 and the color resist layer 129, and/or between the common electrode 125 and the color resist layer 129. Considering the susceptibility of the color resist layer 129 to corrosion by acids and bases and the uneven thickness of the layers of the individual colors, deployment of the overcoat 127 may prevent damage to the color resist layer 129 and render surfaces of the overcoat 127 contacting both the organic dielectric layer 123 and the common electrode 125 more flat. To obviate light leakage, preferably a black matrix 131 is further included on the second substrate 101b, with the color resist layer 129 overlaying the black matrix 131. However, the black matrix 131 it is not limited to such a structure, and may also be positioned above the color resist layer 129 or at other positions. The black matrix 131 may be made of an organic material (e.g., a color resist, a multicolor resist stack, or other colored materials), a metal (e.g., Au, Sn, Cu, Ag, Fe, Pb, Cd, Mo, Hf, Nd, Ti, Ta, other appropriate materials, nitrides thereof, oxides thereof, alloys thereof, or a combination thereof), or a combination thereof.

Figure 2A:
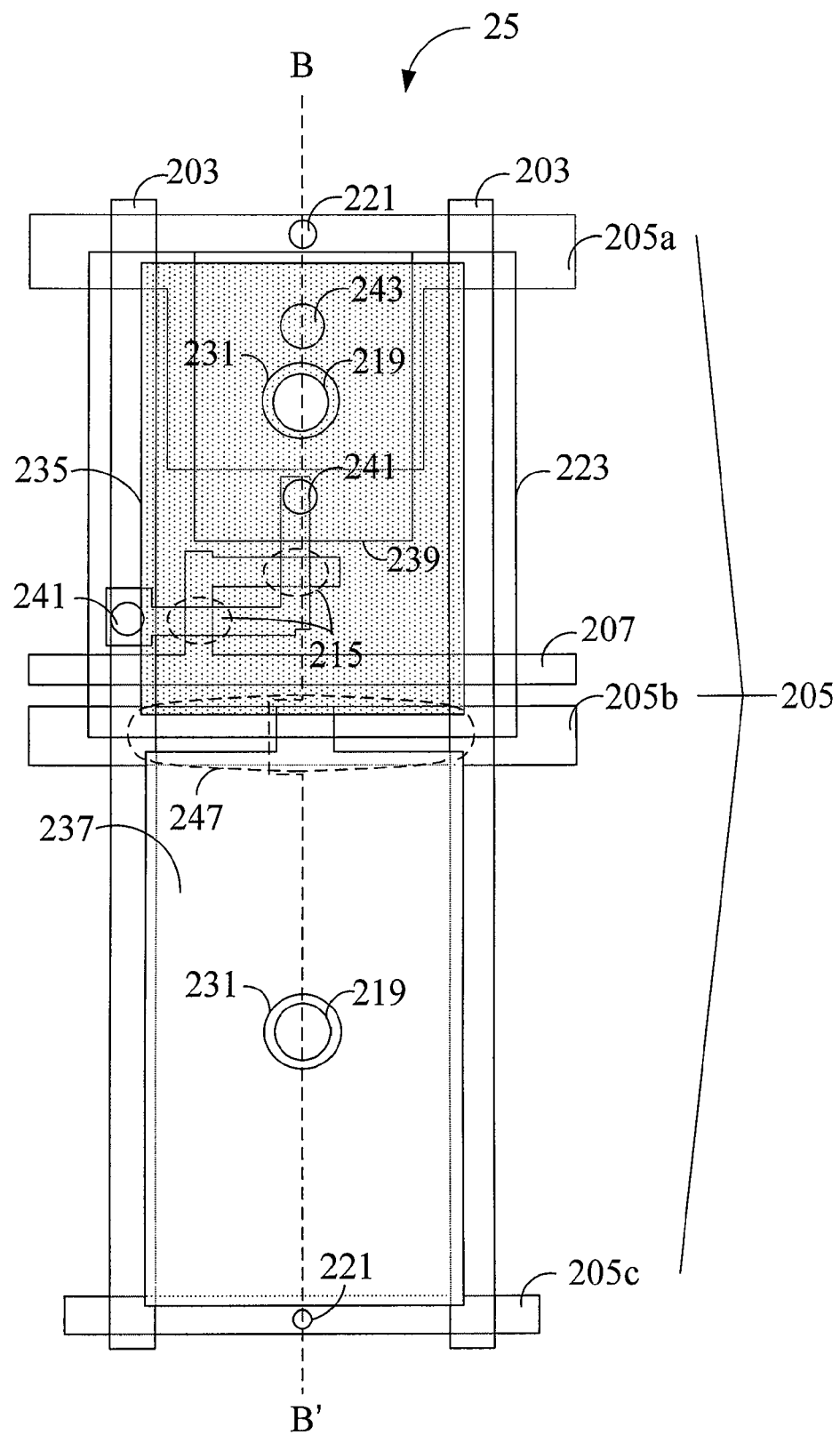
FIG. 2A illustrates a partial top view of a display panel of a second embodiment in accordance with this invention.

A display panel 25 disclosed in a second embodiment of this invention comprises a pair of substrates 201a, 201b, a plurality of data lines 203, a plurality of common lines 205a, 205b, 205c, a plurality of scan lines 207, a first dielectric layer 209, a second dielectric layer 211, a third dielectric layer 213, a fourth dielectric layer 245, a switch element 215, a display media layer 217, an alignment element 219, a spacer 221, a common electrode 225, an overcoat 227, a color resist layer 229, and a black matrix (BM) 231. The corresponding relationships of which are depicted in FIGS. 2A and 2B.

Figure 2B:
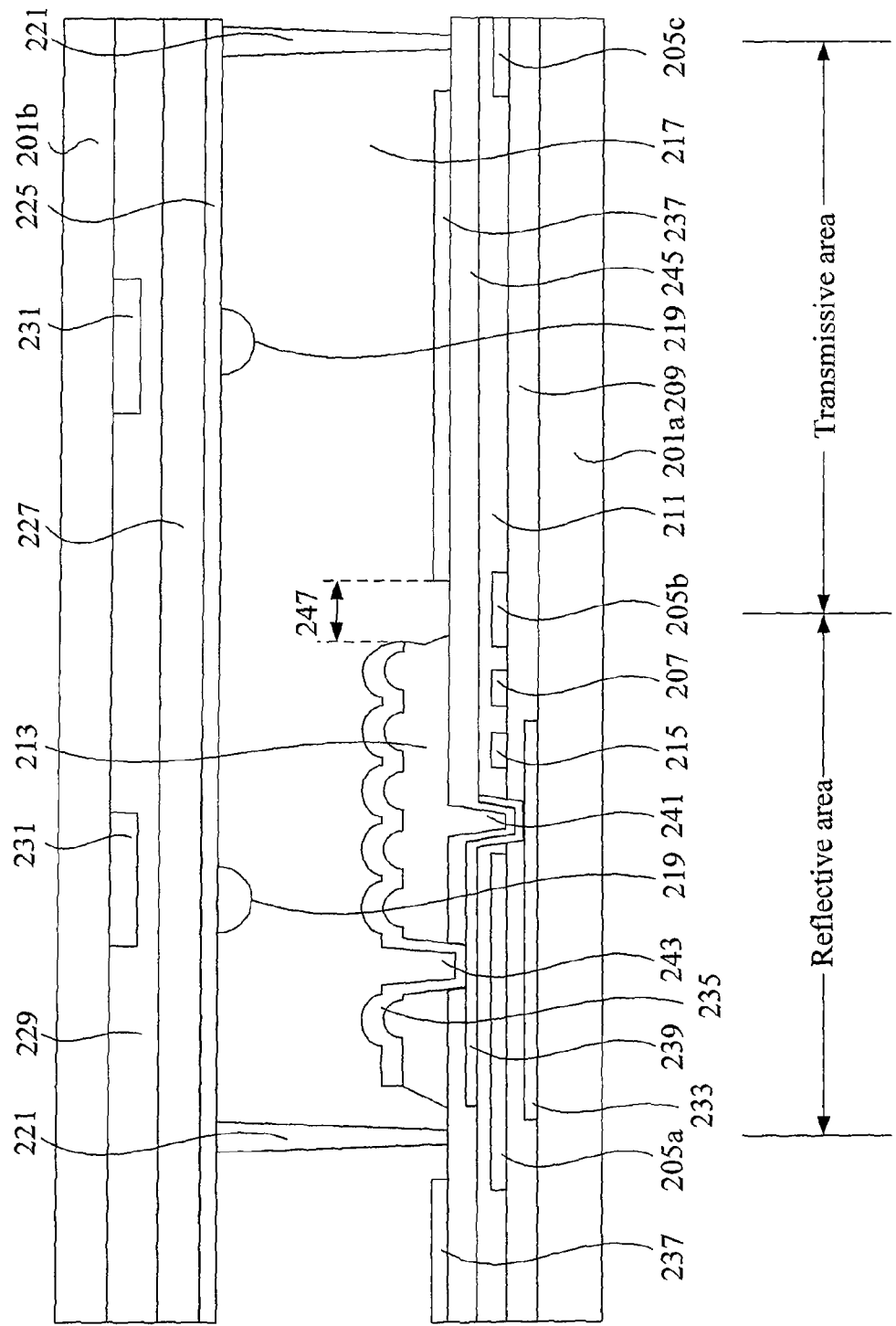
FIG. 2B is a cross-sectional view along line B-B' in FIG. 2A.

In reference to FIG. 2B, the pair of substrates comprises a first substrate 201a and a second substrate 201b. The plurality of data lines 203 (not shown) are formed on the first substrate 201a, as are also the plurality of common lines 205a, 205b, 205c. The common lines 205a, 205b, 205c are substantially parallel to the scan lines 207, and interlaced with the data lines 203 to form a plurality of areas.

Although the design architecture of this invention is not limited to the architecture of a transflective type LCD, this architecture will be described as an embodiment in the following description to highlight the advantages of this invention. In the display panel 25, one data line 203 and three common lines 205a, 205b, 205c can be substantially interlaced to define two areas, one of which may be a reflective area with an electrode made of a reflective material (called as a reflective electrode 235). The other of which may be a transmissive area with an electrode made of a transmissive material (called as a transparent electrode 237). In other embodiments, the electrodes may be made of a reflective material (also known as an opaque material, e.g., Au, Sn, Cu, Ag, Fe, Pb, Cd, Mo, Hf, Nd, Ti, Ta, other appropriate materials, nitrides thereof, oxides thereof, alloys thereof, or a combination thereof), a transparent material (e.g., Indium Zinc Oxide (IZO), Aluminum Zinc Oxide (AZO), Cadmium Tin Oxide (CTO), Hafnium oxide, other materials, or a combination thereof), or a combination thereof.

In this embodiment, each of the reflective areas forms a sub-pixel with one of its adjacent transmissive areas. Between the transmissive area and the reflective area in each sub-pixel is a first main slit 247. A plurality of sub-pixels of different colors in turn forms a pixel, which is the basic structure for displaying an image in the display panel 25. However, in other embodiments, a sub-pixel may be formed by identical areas, for example, formed entirely by reflective areas or by transmissive areas. There is also a main slit between any two adjacent areas, such as the first main slit 247 shown in FIG. 1A. Preferably, the location of the first main slit 247 should correspond to that of the common line 205b, although it is not limited thereto. The second embodiment differs significantly from the first embodiment in that the common electrode 225 has a flat surface, and the optical path adjustment to the reflective areas is accomplished by a dielectric layer (the third dielectric layer 213) disposed below the reflective electrode 235.

Again, in reference to FIG. 2B, the first dielectric layer 209, the second dielectric layer 211, and the fourth dielectric layer 245, which may also be called insulation layers, are all formed on the first substrate 201a for insulation purposes. In this embodiment, the first substrate 201a is located on one side of the first dielectric layer 209, while the second dielectric layer 211 is located on the other side thereof. Interposed partially between the first dielectric layer 209 and the first substrate 201a is a polysilicon layer 233, which is located in the reflective area. Interposed between the first dielectric layer 209 and the second dielectric layer 211 are common lines 205a, 205b, 205c, a switch element 225, a scan line 207, and so on. Interposed between the second dielectric layer 211 and the fourth dielectric layer 245 is a metal layer 239. In addition, the first dielectric layer 209, the second dielectric layer 211, and the fourth dielectric layer 245 may be a single layer structure or a multi-layer structure and may be made of organic materials (e.g., a photoresist, polyarylene ether (PAE), polyamides, polyesters, polyalcohols, polyolefins, benzocyclclobutene (BCB), hydrogen silsesquioxane (HSQ), methyl silsesquioxane (MSQ), SiOC—H, or other materials, or a combination thereof), inorganic materials (e.g., silicon oxide, silicon nitride, silicon oxynitride, silicon carbide, hafnium oxide, or other materials, or a combination thereof), or a combination thereof.

For purposes of description, the three common lines depicted in FIG. 2A are represented by a first common line 205a, a second common line 205b, and a third common line 205c, respectively. The electric potential differences between the common lines are substantially equal to each other, which may be achieved by an electrically parallel connection or by supplying substantially equal potentials. In this embodiment, the reflective area is located between the first common line 205a and the second common line 205b, while the transmissive area is located between the second common line 205b and the third common line 205c. In other words, the first common line 205a and the third common line 205c are the most distant from each other. Additionally, the second common line 205b is the closest to the scan line 207, and is disposed on the border between the reflective area and the transmissive area. The second common line 205b should be made of an opaque material or a reflective material, for example, Au, Sn, Cu, Ag, Fe, Pb, Cd, Mo, Hf, Nd, Ti, Ta, other appropriate materials, nitrides thereof, oxides thereof, alloys thereof, or a combination thereof.

The switch element 215 is located between an electrode of one of these areas and the first substrate 201a. In this embodiment, the switch element 215 is formed between the reflective electrode 235 of the reflective area and the first substrate 201a, and is formed under the reflective electrode 235, as shown in FIG. 2B. The switch element 215 is a thin film transistor (TFT) of a top gate structure or of a bottom gate structure, which comprises a source, a drain, and a gate (not shown). In this embodiment, the TFT is a top gate structure as an exemplification, but not limited thereto. The source is electrically connected to the reflective electrode 235 portion of the pixel electrode, the drain is electrically connected to the data line 203, and the gate is electrically connected to the scan line 207. For example, in a bottom gate structure (not shown), further disposed above the gate is an insulation layer, and the source and the drain is formed on the insulation layer. Another insulation layer is in turn disposed above the source and the drain.

The metal layer 239, is formed on a portion of the second dielectric layer 211, and a portion of the metal layer 239 is further formed downwards through a via hole 241 and penetrates through the first dielectric layer 209 and the second dielectric layer 211, so as to connect the polysilicon layer 233. At this point, the metal layer 239 is said to be a drain/source of a TFT.

The third dielectric layer 213 is located above the fourth dielectric layer 245 and the metal layer 239. The third dielectric layer 213 may be made of an organic material (e.g., a photoresist, polyarylene ether (PAE), polyamides, polyesters, polyalcohols, polyolefins, benzocyclclobutene (BCB), hydrogen silsesquioxane (HSQ), methyl silsesquioxane (MSQ), SiOC—H, or other materials, or a combination thereof), an inorganic material (e.g., silicon oxide, silicon nitride, silicon oxynitride, silicon carbide, hafnium oxide, or other materials, or a combination thereof), or a combination thereof. Alternatively, the third dielectric layer 213 may be a dielectric layer adapted to an ultra high aperture ratio technology, in which case, it may be organic material with a macromolecular is adapted, which features a low dielectric constant and a high light transmissivity for mitigating the influence of the stray current on the pixels. Additionally, in this embodiment, in consideration of the transflective characteristic, the goal to obtain the same optical paths in both the reflective area and the transmissive area is accomplished by the third dielectric layer 213, which is formed only in the reflective area. In this way, the two areas differ in thickness by the thickness of the third dielectric layer 213, and since the reflective area can reflect light, the reflective area and the transmissive area may be adjusted to the same optical paths.

In reference to FIG. 2A, the reflective electrode 235 and the transparent electrode 237 of the two areas are connected to each other at the first main slit 247 to form a pixel electrode. The scan line 207 is formed on the first substrate 201a under an electrode of either of the areas. In this embodiment, the scan line 207 is formed under the reflective electrode 235 of the reflective area. The reflective electrode 235 comprises a reflective layer which may be a reflecting plate or a reflecting mirror. The reflective layer should have a rough surface, which may be achieved by forming a rough surface with the Al bumps or forming a rough surface of the third dielectric layer before forming the reflective layer thereon, thus obtaining a rough surface to reflect light uniformly, thereby increasing the reflecting efficiency. A portion of the reflective layer is formed downwards through a contact hole 243 and penetrates through the third dielectric layer 213 and the fourth dielectric layer 245 to adjoin the metal layer 239.

The display media layer 217 is disposed above the transparent electrode 237 and the reflective electrode 235. The display media layer 217 comprises a plurality of molecules, which in this embodiment are liquid crystal molecules that can rotate to change their directions under the influence of the pixel electrode. Among these molecules in the display media layer 217, those adjacent to the individual substrates 201a, 201b are substantially perpendicular to the surface of respective substrates.

Alignment elements 219 are formed in these areas, and particularly formed at about the central positions of the reflective area and the transmissive area, such that each sub-pixel has at least two alignment elements 219. The alignment elements 219 may be located all on one side of the same substrate 201b or 201a, or located alternately on opposite sides of the two substrates 201a, 201b. The alignment elements 219 may be conventional protrusions, and should be made of organic materials (e.g., a photoresist, polyarylene ether (PAE), polyamides, polyesters, polyalcohols, polyolefins, benzocyclclobutene (BCB), hydrogen silsesquioxane (HSQ), methyl silsesquioxane (MSQ), or other materials, or a combination thereof). However, the materials are not limited thereto, and may also be made of inorganic materials (e.g., silicon oxide, silicon nitride, silicon oxynitride, silicon carbide, hafnium oxide, or other materials, or a combination thereof), or a combination of an organic material and an inorganic material to control the orient of the liquid crystal molecules to obtain a result which is a multi-domain vertical alignment. Consequently, the molecules adjacent to the alignment elements 219 tend to be substantially perpendicular to a surface of the alignment elements 219.

The spacers 221 are formed between the third dielectric layer 213 and the common electrode 225 at locations corresponding to the first common line 205a and the third common line 205c. In particular, the spacers 221 are formed at the periphery of the areas with scan lines 207, which in this embodiment is at the periphery of the reflective areas. The spacers 221 maintain a cell gap between the first substrate 201a and the second substrate 201b to prevent variation of the liquid crystal response characteristics due to an uneven gap.

In this embodiment, the common electrode 225 is formed on the side of the second substrate 201b opposite to the first substrate 201a and above the display media layer 217, the alignment elements 219, and the spacers 221. In this embodiment, the common electrode 225 is made of an Indium Tin Oxide (ITO). However, the material is not just limited thereto, but rather may be selectively made of Indium Zinc Oxide (IZO), Aluminum Zinc Oxide (AZO), Cadmium Tin Oxide (CTO), Hafnium oxide, other materials, or a combination thereof. There are also substantially no electric potential differences between the common lines 205 and the common electrode 225.

For example, in the color resist layer 229 on the second substrate 201b, the color resist layer 229 of each sub-pixel takes either the red, green or blue color. Each pixel in turn comprises sub-pixels of these three colors. However, the colors are not limited thereto. Depending on specific design requirements, each pixel may also comprise sub-pixels of one color, two colors, four colors, five colors, six colors, seven colors, etc. In addition to the red, green, and blue colors, the pixels may further comprise black, white (colorless), brown, magenta, jacinth, cyan, or other colors in the color coordinate system (CIE).

The overcoat 227 may be selectively formed between the common electrode 225 and the color resist layer 229. Considering the susceptibility of the color resist layer 229 to corrosion by acids and bases and the uneven thickness of the layers of individual colors, deployment of the overcoat 227 may prevent damage to the color resist layer 229 and render the surface of the overcoat 227 contacting the common electrode 225 more flat. Preferably, to obviate light leakage, a black matrix 231 is further included on the second substrate 201b, with the color resist layer 229 overlaying the black matrix 231. However, the black matrix 231 it is not limited to such a structure, and may also be positioned above the color resist layer 229 or at other positions. The black matrix 231 may be made of an organic material (e.g., a color resist, a multicolor resist stack, or other colored materials), a metal (e.g., Au, Sn, Cu, Ag, Fe, Pb, Cd, Mo, Hf, Nd, Ti, Ta, other appropriate materials, nitrides thereof, oxides thereof, alloys thereof, or a combination thereof), or a combination thereof.

Figure 3A:
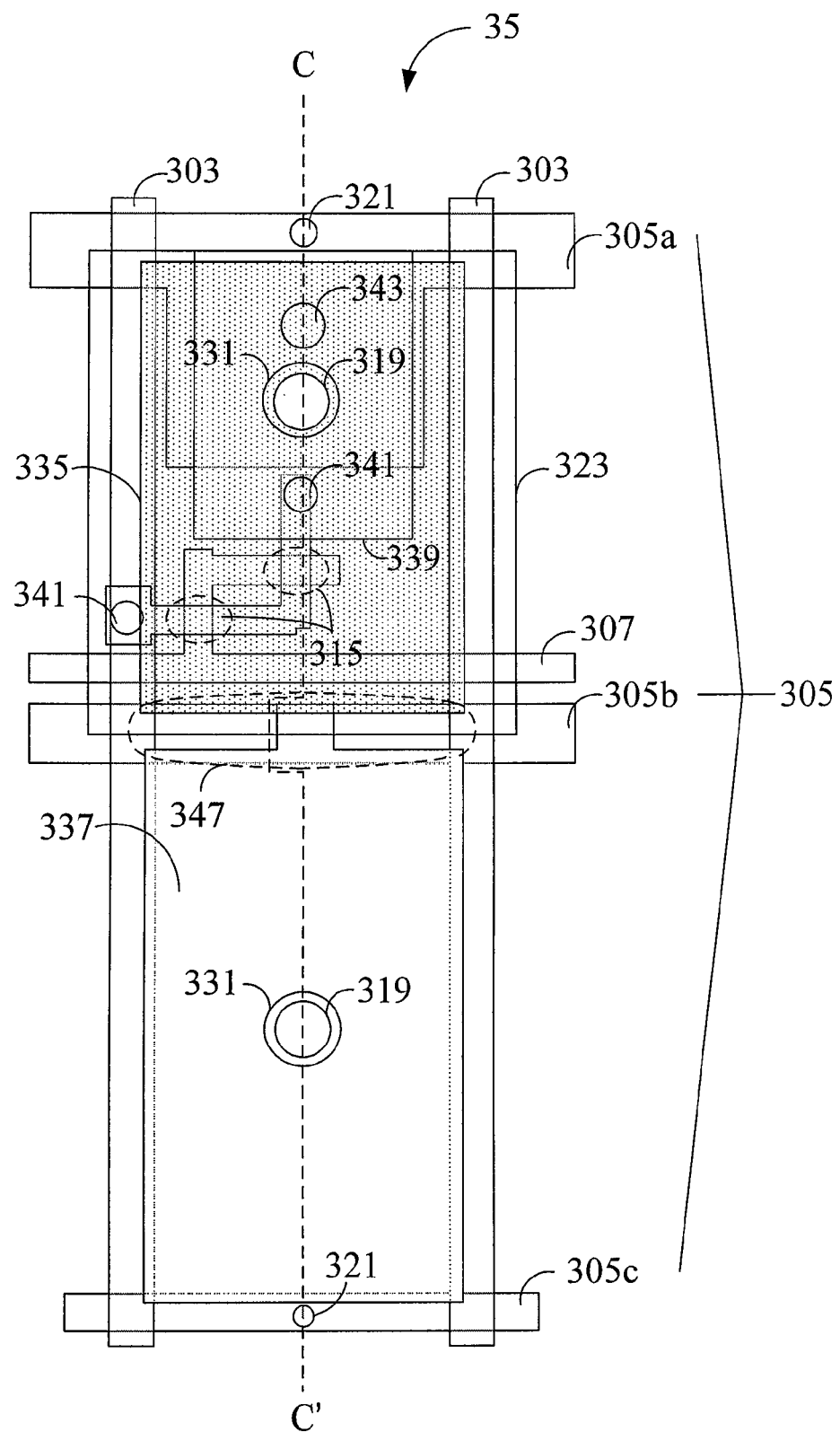
FIG. 3A illustrates a partial top view of a display panel of a third embodiment in accordance with this invention.

A display panel 35 disclosed in the third embodiment of this invention comprises a pair of substrates 301a, 301b, a plurality of data lines 303, a plurality of common lines 305, a plurality of scan lines 307, a first dielectric layer 309, a second dielectric layer 311, a third dielectric layer 313, a switch element 315, a display media layer 317, an alignment element 319, a spacer 321, an organic dielectric layer 323, a common electrode 325, an overcoat 327, a color resist layer 329, and a black matrix (BM) 331. The corresponding relationships of which are depicted in FIGS. 3A and 3B.

Figure 3B:
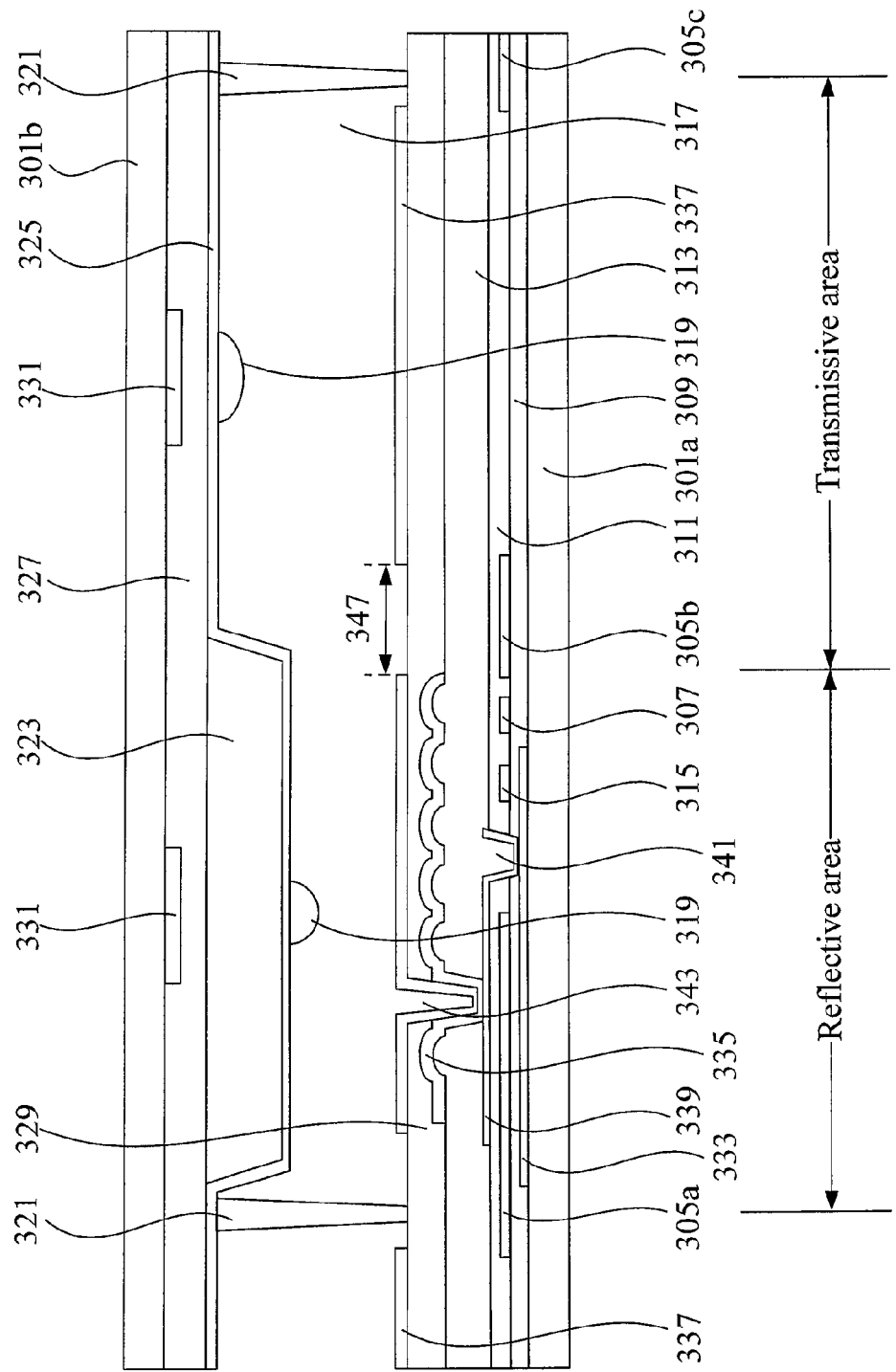
FIG. 3B is a cross-sectional view along line C-C' in FIG. 3A.

In reference to FIG. 3B, the pair of substrates comprises a first substrate 301a and a second substrate 301b. The plurality of data lines 303 (not shown in FIG. 3B) are formed on the first substrate 301a, as are also the plurality of common lines 305a, 305b, 305c. The common lines 305a, 305b, 305c are substantially parallel to the scan lines 307, and interlaced with the data lines 303 to form a plurality of areas.

Although the design architecture of this invention is not limited to the architecture of a transflective type LCD, this architecture will be described as an embodiment in the following description to highlight the advantages of this invention. In the display panel 35, one data line 303 and three common lines 305a, 305b, 305c can be interlaced to define two areas, one of which may be a reflective area with an electrode made of a reflective material (called as a reflective electrode 335). The other reflective area may be a transmissive area with an electrode made of a transmissive material (called as a transparent electrode 337). In other embodiments, the electrodes may be made of a reflective material (also known as an opaque material, e.g., Au, Sn, Cu, Ag, Fe, Pb, Cd, Mo, Hf, Nd, Ti, Ta, other appropriate materials, nitrides thereof, oxides thereof, alloys thereof, or a combination thereof), a transparent material (e.g., Indium Zinc Oxide (IZO), Aluminum Zinc Oxide (AZO), Cadmium Tin Oxide (CTO), Hafnium oxide, other materials, or a combination thereof), or a combination thereof.

In this embodiment, each of the reflective areas forms a sub-pixel with one of its adjacent transmissive areas. Between the transmissive area and the reflective area in each sub-pixel is a first main slit 347. A plurality of sub-pixels of different colors forms a pixel, which is the basic structure for displaying an image in the display panel 35. In other embodiments, a sub-pixel may be formed by the identical areas, for example, by reflective areas or by transmissive areas. A main slit, such as the first main slit 347 shown in FIG. 3A, exists between any two adjacent areas. Preferably, the location of the first main slit 347 should correspond to that of the common line 305b, although it is not limited thereto.

In reference to both FIG. 3B, both the first dielectric layer 309 and the second dielectric layer 311, which may also be called insulation layers, are formed on one side of the first substrate 301a for insulation purposes. The first substrate 301a is located on one side of the first dielectric layer 309, while the second dielectric layer 311 is located on the other side thereof. Interposed partially between the first dielectric layer 309 and the first substrate 301a is a polysilicon layer 333, which is located in the reflective area. Interposed between the first dielectric layer 309 and the second dielectric layer 311 are common lines 305a, 305b, 305c, a switch element 315, a scan line 307, and so on. In addition, the first dielectric layer 309 and the second dielectric layer 311 may be a single layer structure or a multi-layer structure and may be made of organic materials (e.g., a photoresist, polyarylene ether (PAE), polyamides, polyesters, polyalcohols, polyolefins, benzocyclclobutene (BCB), hydrogen silsesquioxane (HSQ), methyl silsesquioxane (MSQ), SiOC—H, or other materials, or a combination thereof), inorganic materials (e.g., silicon oxide, silicon nitride, silicon oxynitride, silicon carbide, hafnium oxide, or other materials, or a combination thereof), or a combination thereof.

For description purposes, the three common lines depicted in FIG. 3A are represented by a first common line 305a, a second common line 305b, and a third common line 305c, respectively. The electric potential differences between the common lines are substantially equal to each other, which may be achieved by an electrically parallel connection or by supplying substantially equal potentials. In this embodiment, the reflective area is located between the first common line 305a and the second common line 305b, while the transmissive area is located between the second common line 305b and the third common line 305c. In other words, the first common line 305a and the third common line 305c are the most distant from each other. Additionally, the second common line 305b is the closest to the scan line 307, and is disposed on the border between the reflective area and the transmissive area. The second common line 305b should be made of an opaque material or a reflective material, for example, Au, Sn, Cu, Ag, Fe, Pb, Cd, Mo, Hf, Nd, Ti, Ta, other appropriate materials, nitrides thereof, oxides thereof, alloys thereof, or a combination thereof.

The switch element 315 is located between an electrode of one of these areas and the first substrate 301a, and in this embodiment, is formed between the reflective electrode 335 of the reflective area and the first substrate 301a, as shown in FIG. 3B. The switch element 335 is a thin film transistor (TFT) of a top gate structure or of a bottom gate structure, which comprises a source, a drain, and a gate (not shown). In this embodiment, the TFT is a top gate structure as an exemplification, but not limited thereto. The source is electrically connected to the reflective electrode 335 portion of the pixel electrode, the drain is electrically connected to the data line 303, and the gate is electrically connected to the scan line 307. For example, in a bottom gate structure (not shown), an insulation layer is further disposed above the gate, the source and the drain is formed on the insulation layer. Another insulation layer is in turn disposed above the source and the drain.

A metal layer 339 is formed on a portion of the second dielectric layer 311, a portion of the metal 339 is further formed downwards through a via hole 341 and penetrates through the first dielectric layer 309 and the second dielectric layer 311, so as to connect the polysilicon layer 333. At this point, the metal layer 339 is said to be a drain/source of a TFT.

The third dielectric layer 313 is located above the second dielectric layer 311 and the metal layer 339. The third dielectric layer 313 may be made of an organic material (e.g., photoresist, polyarylene ether (PAE), polyamides, polyesters, polyalcohols, polyolefins, benzocyclclobutene (BCB), hydrogen silsesquioxane (HSQ), methyl silsesquioxane (MSQ), SiOC—H, or other materials, or a combination thereof), an inorganic material (e.g., silicon oxide, silicon nitride, silicon oxynitride, silicon carbide, hafnium oxide, or other materials, or a combination thereof), or a combination thereof. Alternatively, the third dielectric layer 313 may be a dielectric layer adapted to an ultra high aperture ratio technology, in which case, it would be an organic layer featuring a low dielectric constant and a high light transmissivity for mitigating the influence of the stray current on the pixels.

A significant difference of this embodiment from the first embodiment is that the color resist layer 329 moves from the side of the second substrate 301b to the side of the first substrate 301a. The color resist layer 329 is located above the third dielectric layer 313 and the reflective electrode 335. The color resist layer 329 of each sub-pixel takes either the red, green, or blue color. Each pixel in turn comprises sub-pixels of these three colors. However, the colors are not limited thereto. Depending on the specific design requirements, each pixel may also comprise sub-pixels of one color, two colors, four colors, five colors, six colors, seven colors, and so on. In addition to the red, green, and blue colors, the pixels may further comprise black, white (colorless), brown, magenta, jacinth, cyan, or other colors in the color coordinate system (CIE).

It can be seen from the above three embodiments that the color resist layer may be located on either the side of first substrate 101a, 201a, 301a or on the side of the second substrate 101b, 201b, 301b. Meanwhile, if a sub-pixel comprises both a reflective area and a transmissive area, the third dielectric layer for adjusting the optical path of the reflective area may be located either on the side of first substrate 101a, 201a, 301a or on the side of the second substrate 101b, 201b, 301b. Those skilled in the art may adjust the sub-pixel structure by themselves depending on the applicable processes. Therefore, the above description is not intended to limit the scope of this invention.

Still in reference to FIG. 3A, the reflective electrode 335 and the transparent electrode 337 of the two areas are connected to each other at the first main slit 347 to form a pixel electrode. The scan line 307 is also formed on the first substrate 301a under the electrode of either of the areas, and in this embodiment, is formed under the reflective electrode 335 of the reflective area. The reflective electrode 335 comprises a reflective layer which may be a reflecting plate or a reflecting mirror. The reflective layer should have a rough surface, which may be achieved by forming a rough surface with the Al bumps or forming a rough surface of the third dielectric layer before forming the reflective layer thereon, thus obtaining a rough surface to reflect light uniformly, thereby to increase the reflecting efficiency. A portion of the reflective layer is formed downwards through a contact hole 343 and penetrates through the third dielectric layer 313, so as to connect the metal layer 339. In this embodiment, a transparent electrode 337 layer is further formed above the color resist layer 329 of the reflective area.

The display media layer 317 is disposed above the transparent electrode 337 and the color resist layer 329. The display media layer 317 comprises a plurality of molecules, which in this embodiment are liquid crystal molecules that can rotate to change their directions under the influence of the pixel electrode.

Alignment elements 319 are formed in these areas, and particularly formed at about the central positions of the reflective area and the transmissive area, such that each sub-pixel has at least two alignment elements 319. The alignment elements 319 may be located all on one side of the same substrate 301b or 301a, or located alternately on opposite sides of the two substrates 301a, 301b. The alignment elements 319 may be conventional protrusions, and may be made of organic materials (e.g., photoresist, polyarylene ether (PAE), polyamides, polyesters, polyalcohols, polyolefins, benzocyclclobutene (BCB), hydrogen silsesquioxane (HSQ), methyl silsesquioxane (MSQ), or other materials, or a combination thereof). However, the materials are not limited thereto, and may also be made of inorganic materials (e.g., silicon oxide, silicon nitride, silicon oxynitride, silicon carbide, hafnium oxide, or other materials, or a combination thereof), or a combination of an organic material and an inorganic material to control the orient of the liquid crystal molecules to obtain a result which is a multi-domain vertical alignment. Consequently, the molecules adjacent to the alignment elements 319 tend to be substantially perpendicular to the surface of the alignment elements 319.

The spacers 321 are formed between the third dielectric layer 313 and the common electrode 325 at locations corresponding to the first common line 305a and the third common line 305c. In particular, the spacers 321 are formed at the periphery of the areas with the scan lines 307, which in this embodiment is at the periphery of the reflective areas. The spacers 321 maintain a cell gap between the first substrate 301a and the second substrate 301b to prevent variation of the liquid crystal response characteristics due to an uneven gap.

In consideration of the transflective characteristic, an organic dielectric layer 323 is disposed between the common electrode 325 and the overcoat 327 at locations corresponding to the areas with the scan lines 307 (i.e. the reflective areas), in order for the reflective areas and the transmissive areas to exhibit different optical paths. This technology may be commonly called a multi gap on color filter (MOC) technology. The display media layer 317 comprises a lot of molecules, among which the molecules adjacent to an exterior surface of the organic dielectric layer 323 are substantially perpendicular to the exterior surface, while those adjacent to individual substrates 301a, 301b are substantially perpendicular to the surface of the respective substrates.

In this embodiment, the common electrode 325 is formed on the side of the second substrate 301b opposite to the first substrate 301a and above the display media layer 317, the alignment elements 319, and the spacers 321. In this embodiment, the common electrode 325 is made of an Indium Tin Oxide (ITO). However, the material is not just limited thereto, but rather may be selectively made of Indium Zinc Oxide (IZO), Aluminum Zinc Oxide (AZO), Cadmium Tin Oxide (CTO), Hafnium oxide, other materials, or a combination thereof. There are substantially no electric potential differences between the common lines 305a, 305b, 305c and the common electrode 325.

Preferably, to obviate light leakage, a black matrix 331 should be further included on the second substrate 301b. To avoid an uneven thickness of the display panel 35 caused by the black matrix 331 and to make the surface of the panel more flat, there should also be an overcoat 327 selectively formed between the common electrode 325 and the black matrix 331 and the second substrate 301b.

Figure 4A:
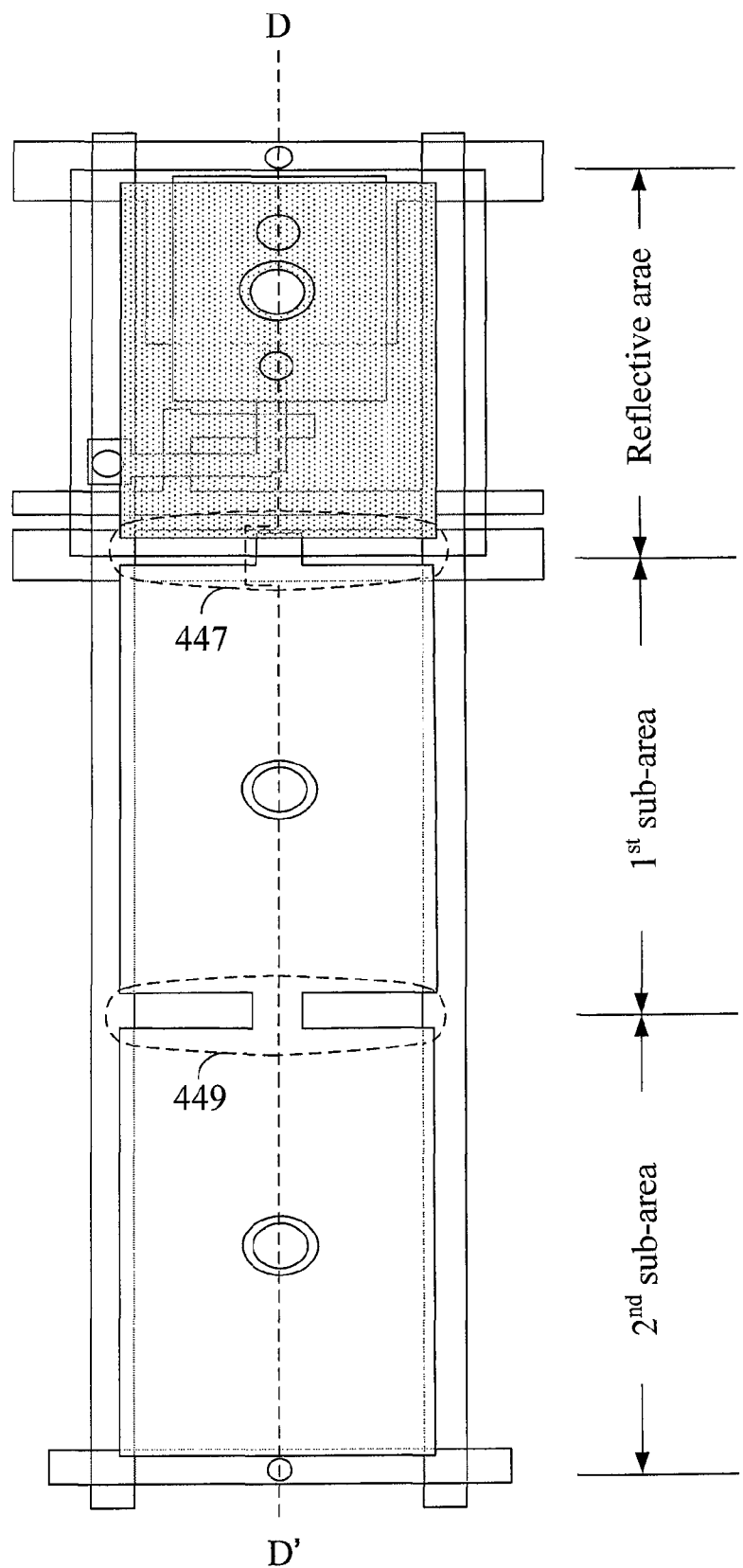
FIG. 4A illustrates a partial top view of a display panel of a fourth embodiment in accordance with this invention.
Figure 4B:
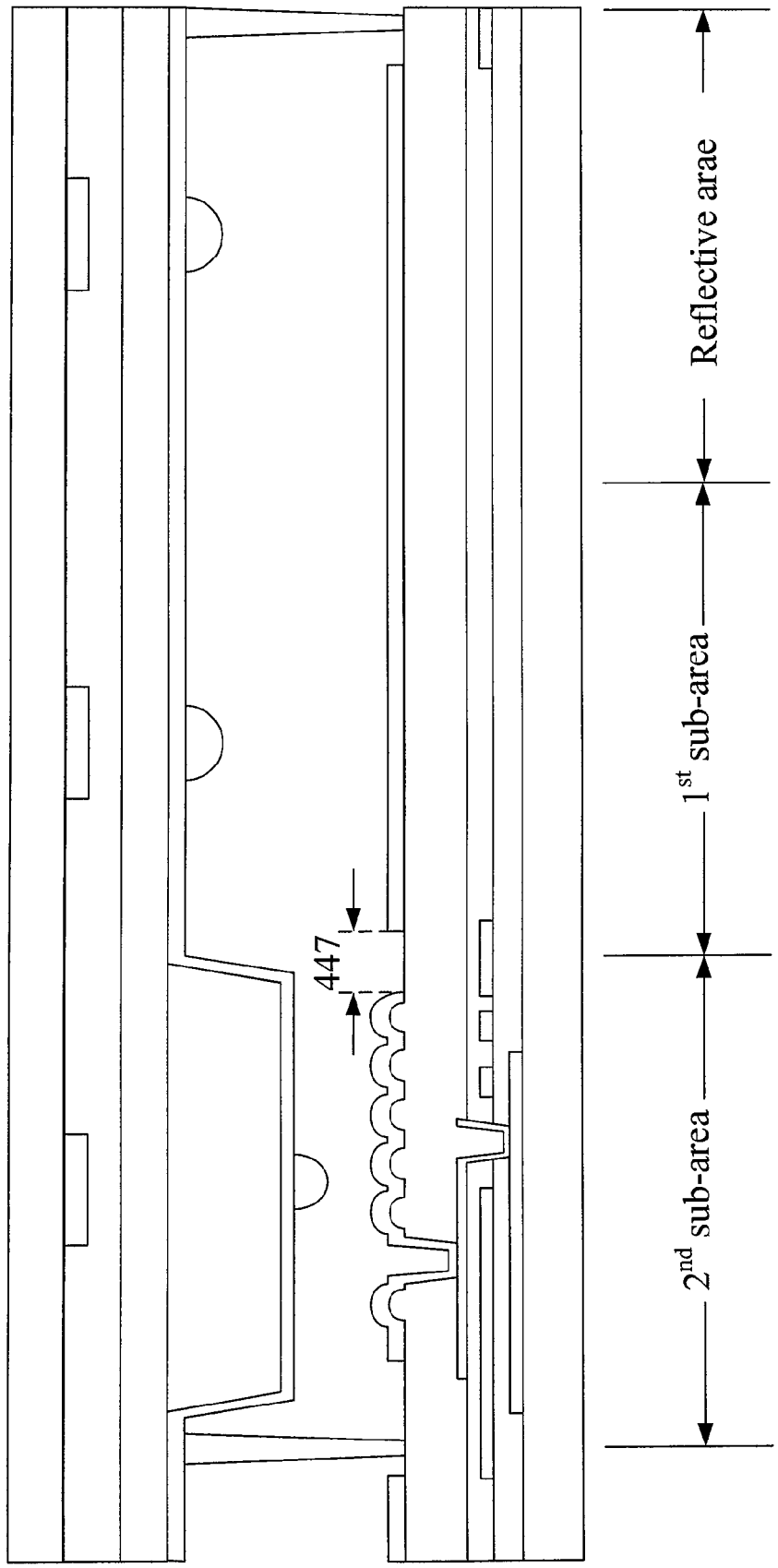
FIG. 4B is a cross-sectional view along line D-D' in FIG. 4A.

Other implementation aspects may be derived from each of the display panels of the above embodiments. This will be described with reference to an example shown in FIG. 4A and FIG. 4B, which depict an architecture derived from that of the first embodiment.

In the two areas defined by the data line and three common lines, one is a reflective area with an electrode made by a reflective material (called as a reflective electrode). The other reflective area is a transmissive area with an electrode made of a transparent material (called a transparent electrode). The transmissive area in turn has a first sub-area and a second sub-area, which have a first transparent sub-electrode and a second transparent sub-electrode respectively combined into the aforesaid transparent electrode. The first sub-area is located between the reflective area and the second sub-area, while the second sub-area is located between the first sub-area and the reflective area of another sub-pixel. A first main slit 447 is formed between the transmissive area and the reflective area, while a second main slit 449 is formed between the first sub-area and the second sub-area. Each reflective area and one of its adjacent transmissive areas together form a sub-pixel, while three sub-pixels in turn form a pixel. This format is the basic structure for displaying an image on the display panel. However, in the other embodiments, the two areas may both be reflective or transmissive areas.

In the preferred embodiment, the first sub-area and the second sub-area may have an area approximately equal to that of the reflective area. In addition, the first sub-area may have the same structure as the second sub-area. Other implementation aspects with more than two sub-areas in the transmissive area or with sub-areas of different structures will readily occur to those skilled in the art.

Figure 1D:
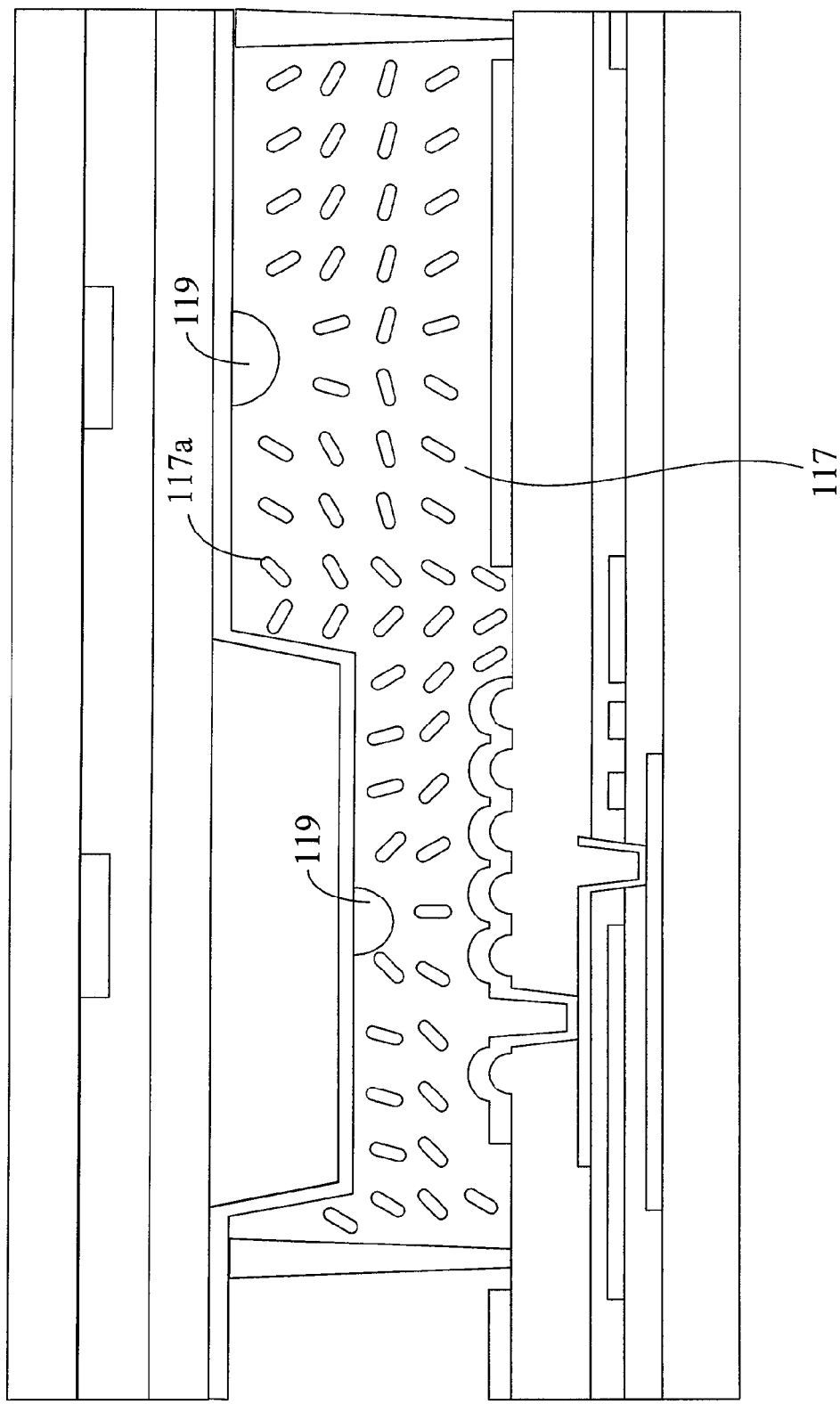
FIG. 1D is illustrates the distribution of the liquid crystal molecules inside the display panel when the pixel electrodes and the common electrode are energized.

FIGS. 1C and 1D will be further described. In the aforesaid embodiments and implementation aspects, for example in the first embodiment, when the switch element 115 is turned off, the pixel electrode and the common electrode 125 are deenergized. At this point, the major axes of the liquid crystal molecules 117a in the display media layer 117 are perpendicular to the two substrates (i.e., perpendicular to the screen), with only those adjacent to the sides of the alignment elements 119 and the organic dielectric layer 123 tilting slightly, as shown in FIG. 1C. In this case, light cannot be transmitted through the two polarizers disposed above/below the first substrate 101a and the second substrate 101b. Additionally, because the first main slit 147 is blocked by the second common line 105b, causing the area below to be opaque, no light will leak therefrom, thus inhibiting the dark-state light leakage.

Also in reference to FIG. 1A, if the driving element connected with the display panel transmits a scan signal and a data signal to the scan line 107 and the data line 103 of the display panel 15 respectively, the scan signal will be transmitted by the scan line 107 to the gate of the switch element 115 to turn it on, resulting in a conduction state between the source and the drain of the switch element 115. Subsequently, the data signal is transmitted by the data line 103 to the pixel electrode, so that the pixel electrode and the common electrode 125 are energized to generate an electric field. Then as shown in FIG. 1D, in response to the electric field, the liquid crystal molecules 117a in the display media layer 117 adjacent to the alignment element 119 will rapidly drive other liquid crystal molecules to rotate into an orientation perpendicular to the surface of the alignment element 119, that is, to tilt their major axes. In this way, the light transmissivity is increased, thus achieving the goal of light modulation.

For the liquid crystal molecules adjacent to the first main slit 147, when the switch element 115 is turned on, they will be influenced from the electric potential distribution of the second common line 105b disposed between the transmissive area and the reflective area, causing the liquid crystal molecules at the periphery of the transmissive area and the reflective area to tilt towards the alignment elements 119 in the respective areas.

Next, a method for fabricating a display panel of the first embodiment will be described, wherein the display panel comprises a plurality of pixels, each of which further comprises several sub-pixels.

Figure 5A:
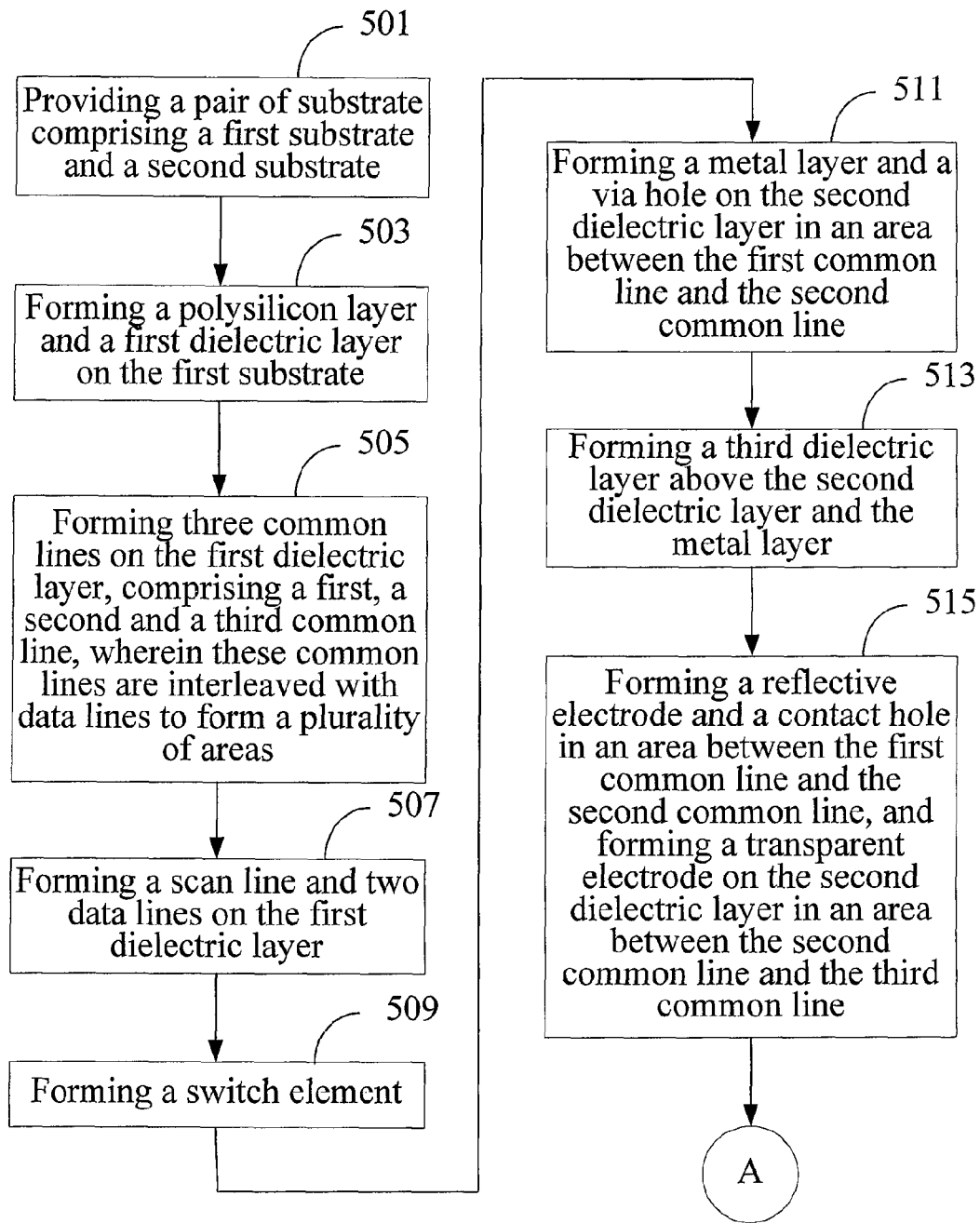
FIG. 5A is the first half of a flow diagram of a method for fabricating the first embodiment in accordance with this invention.
Figure 5B:
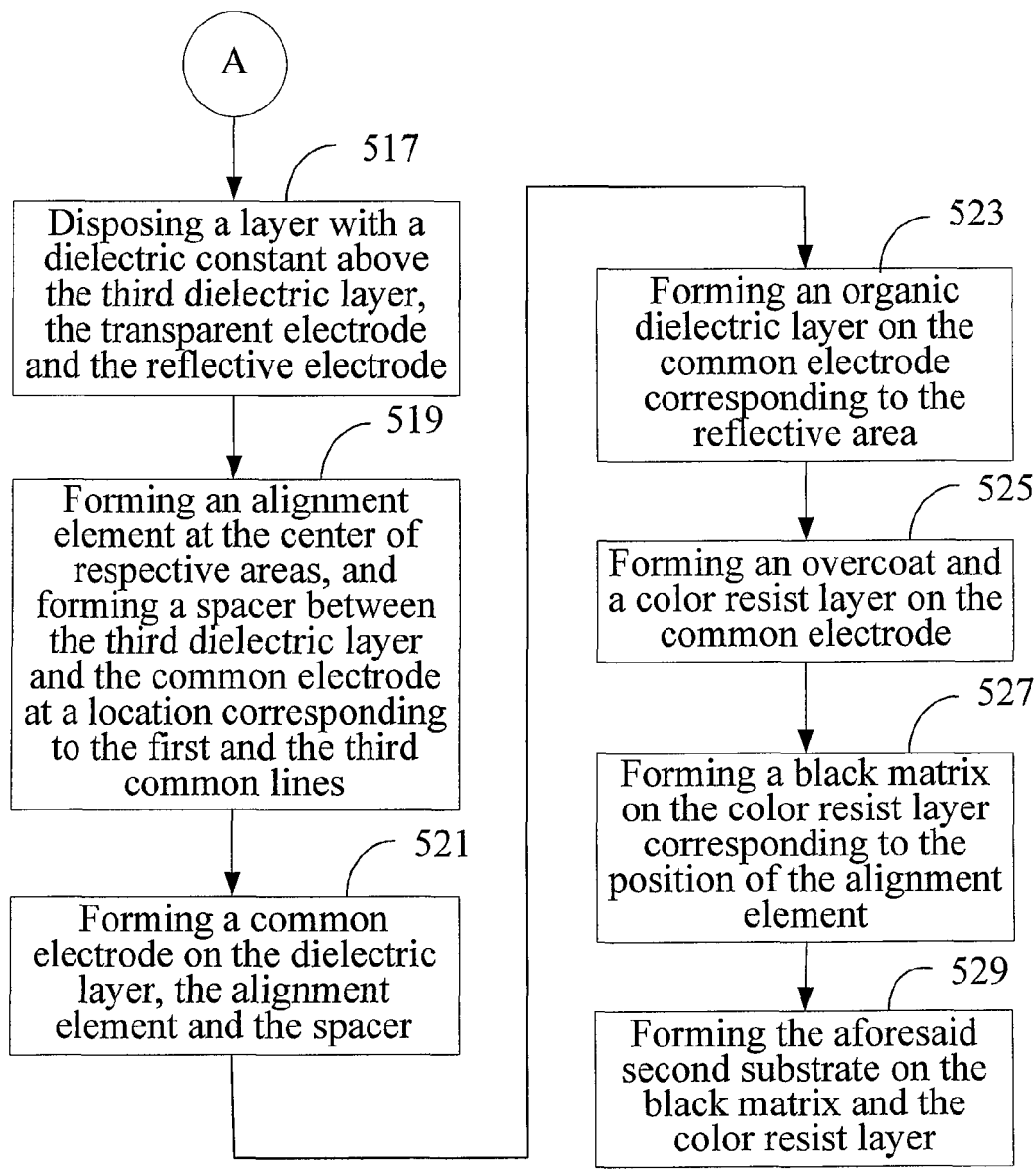
FIG. 5B is the second half of the method shown in FIG. 5A.

As shown in FIGS. 5A and 5B, the method comprises the following steps. In step 501, a pair of substrates is provided, which comprises a first substrate and a second substrate. Next, in step 503, a polysilicon layer and a first dielectric layer are formed on the first substrate, with the polysilicon layer disposed under the first dielectric layer. Then, in step 505, on the first dielectric layer are formed three common lines, comprising a first common line, a second common line, and a third common line, which are to be interlaced with the data lines to define a plurality of areas. The second common line is preferably made of an opaque material (e.g., Au, Sn, Cu, Ag, Fe, Pb, Cd, Mo, Hf, Nd, Ti, Ta, other appropriate materials, nitrides thereof, oxides thereof, alloys thereof, or a combination thereof). In the preferred embodiments, the common lines, all with a substantially equal electric potential, are parallel to each other and perpendicular to the data lines. Thereafter, the scan line and two data lines are formed on the first dielectric layer in step 507. The scan line is more adjacent to the second common line, while both the scan line and the common lines are perpendicular to the data lines. The common lines and the data lines further define a plurality of areas.

Subsequently in step 509, a switch element is formed, which has a source connected to the pixel electrode, a drain connected to a data line, and a gate connected to the scan line. During the formation of the switch element, a gate is formed under the first dielectric layer, and a source and a drain is formed on the first dielectric layer, followed by the formation of a second dielectric layer on the source and the drain. Next, in step 511, a metal layer and a via hole are formed on the second dielectric layer in an area between the first and the second common lines, with the via hole penetrating through the first dielectric layer and the second dielectric layer, so as to connect the polysilicon layer.

In step 513, a third dielectric layer is formed above the second dielectric layer and the metal layer. Then, in step 515, a reflective electrode and a contact hole are formed in an area between the first common line and the second common line. A transparent electrode is formed on the second dielectric layer in an area between the second common line and the third common line. The area comprising the reflective electrode is called a reflective area, while the area comprising the transparent electrode is called a transmissive area. The reflective electrode and the transmissive electrode are connected to form a pixel electrode, while the reflective area and the transmissive area, separated by the first main slit, together form a sub-pixel.

Next, in step 517, a layer with a dielectric constant or namely a display media layer is disposed above the third dielectric layer, the transparent electrode and the reflective electrode. In step 519, an alignment element is preferably formed at the about center of the respective areas, and a spacer is formed between the third dielectric layer and the common electrode at a location corresponding to the first and the third common lines. Then, in step 521, a common electrode, which has substantially a zero electric potential difference with respect to the common lines, is formed on the layer, the alignment element and the spacer.

In step 523, an organic dielectric layer is formed on the common electrode corresponding to the reflective area to change the optical paths of both the reflective area and the transmissive area. Then, in step 525, an overcoat and a color resist layer are formed on the common electrode. The overcoat is sandwiched between the color resist layer and the common electrode to prevent damage to the color resist layer and render its surface more flat. The color resist layer may be a red, green, or blue color. Each pixel comprises sub-pixels of one of these three colors respectively. However, the colors are not limited thereto. Depending on the specific design requirements, each pixel may alternatively comprise sub-pixels of one color, two colors, four colors, five colors, six colors, seven colors, etc. In addition to the red, green, and blue colors, the pixels may further comprise black, white (colorless), brown, magenta, jacinth, cyan, or other colors in the color coordinate system (CIE).

Next, in step 527, a black matrix is formed on the color resist layer corresponding to the position of the alignment element. Finally, in step 529, the aforesaid second substrate is formed on the black matrix and the color resist layer, thus completing a sub-pixel structure. Generally, the sub-pixels of three distinct colors form a pixel, but the arrangement is not just limited thereto. Depending on the specific design requirements, each pixel may alternatively comprise sub-pixels of one color, two colors, four colors, five colors, six colors, seven colors, and so on. Furthermore, a plurality of pixels in turn forms a display panel of the first embodiment.

Next, a method for fabricating the display panel of the second embodiment will be described, wherein the display panel comprises a plurality of pixels, each of which further comprises several sub-pixels.

Figure 6A:
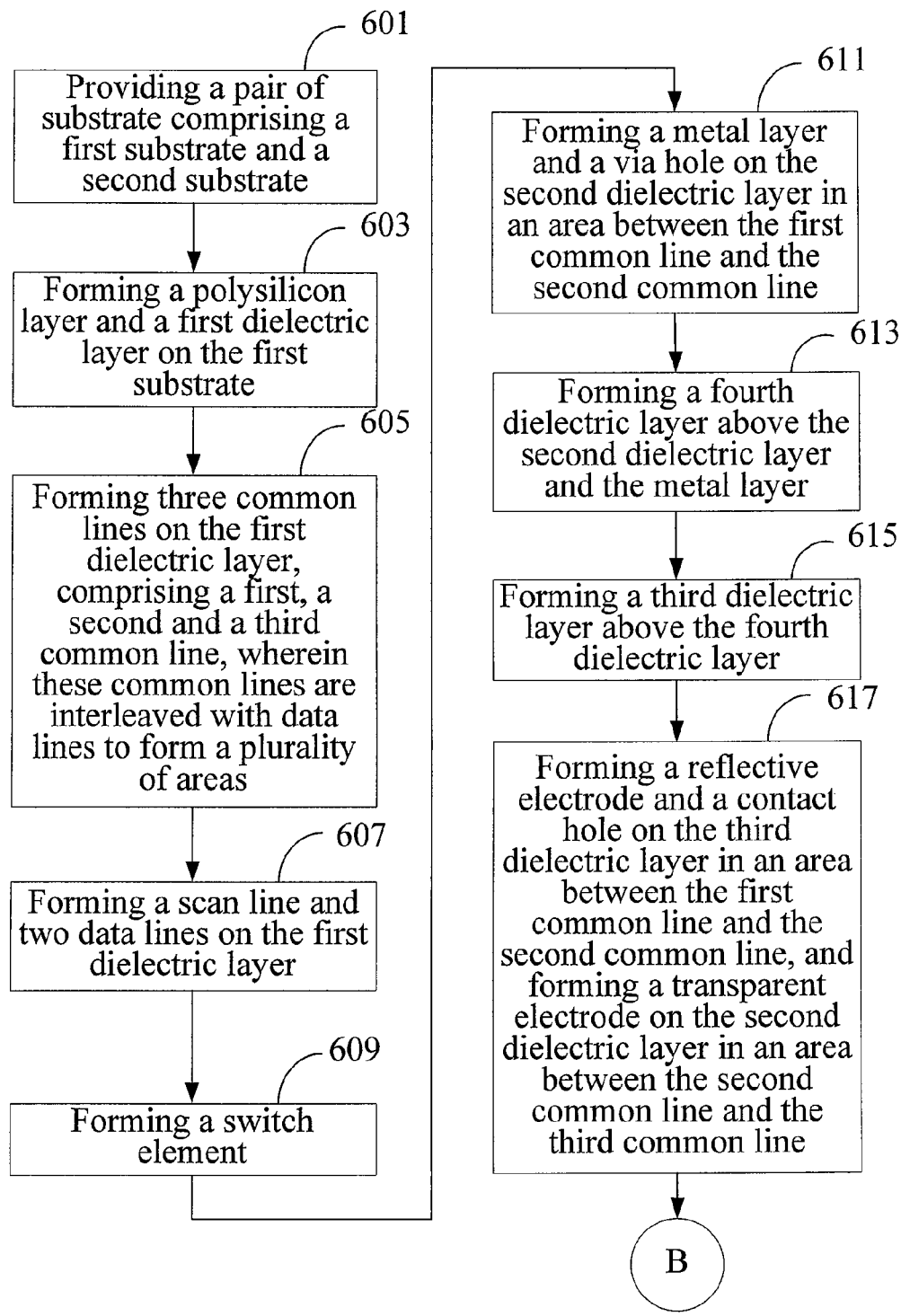
FIG. 6A is the first half of a flow diagram of a method for fabricating the second embodiment in accordance with this invention.
Figure 6B:
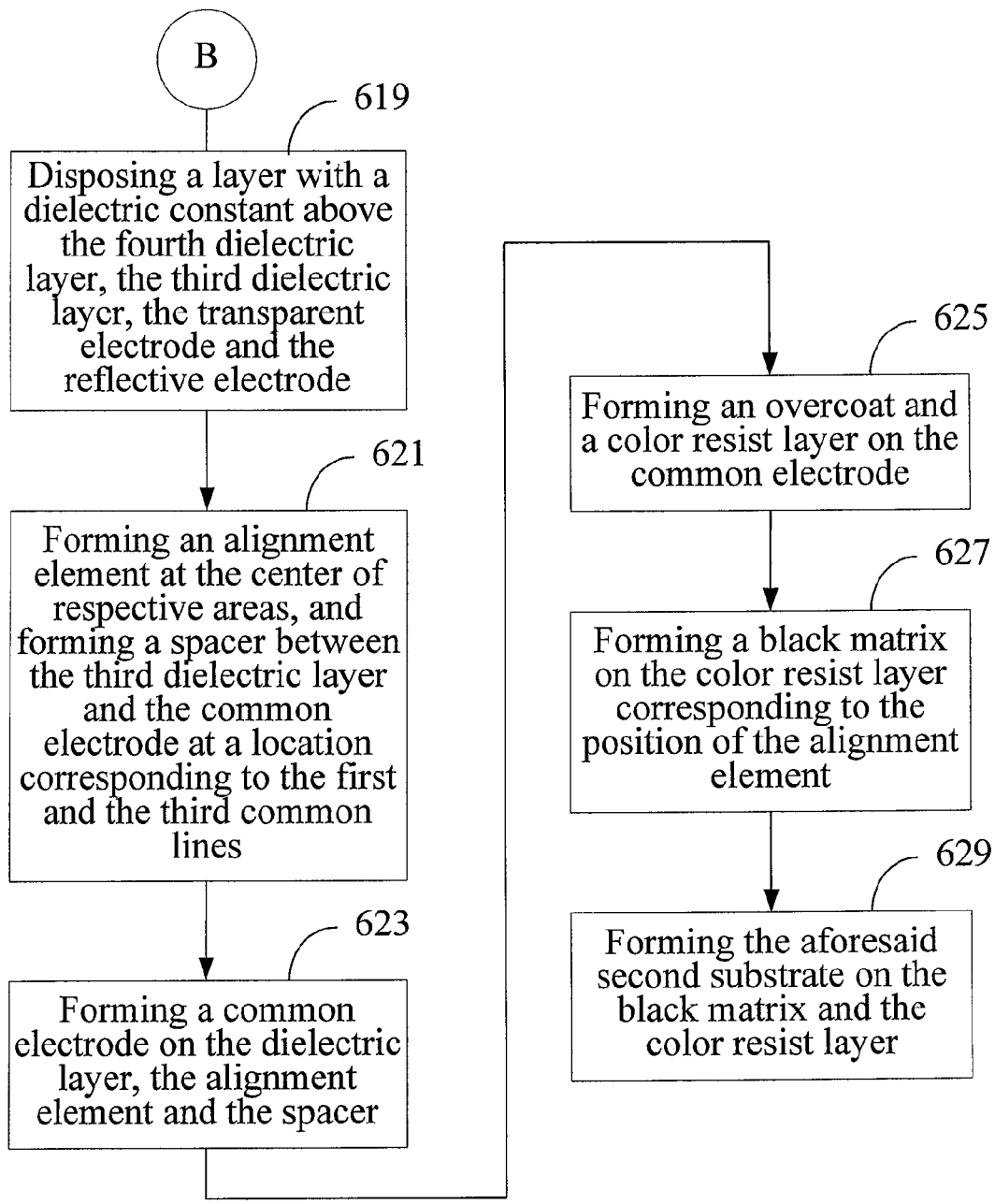
FIG. 6B is the second half of the method shown in FIG. 6A.

As shown in FIGS. 6A and 6B, the method comprises the following steps. In step 601, a pair of substrates is provided, which comprises a first substrate and a second substrate. Next, in step 603, a polysilicon layer and a first dielectric layer are formed on the first substrate, with the polysilicon layer disposed under the first dielectric layer. Then, in step 605, on the first dielectric layer are three common lines, comprising a first common line, a second common line, and a third common line, which are to be interlaced with the data lines to define a plurality of areas. The second common line is preferably made of an opaque material (e.g., Au, Sn, Cu, Ag, Fe, Pb, Cd, Mo, Hf, Nd, Ti, Ta, other appropriate materials, nitrides thereof, oxides thereof, alloys thereof, or a combination thereof). In the preferred embodiments, the common lines, all with a substantially equal electric potential, are parallel to each other and perpendicular to the data lines. Thereafter, a scan line and two data lines are formed on the first dielectric layer in step 607. The scan line is more adjacent to the second common line, both the scan line and the common lines are perpendicular to the data lines, and the common lines and the data lines further define a plurality of areas.

Subsequently in step 609, a switch element is formed, which has a source connected to a pixel electrode, a drain connected to a data line, and a gate connected to the scan line. During the formation of the switch element, a gate is formed under the first dielectric layer, and a source and a drain is formed on the first dielectric layer, followed by the formation of a second dielectric layer on the source and the drain. Next, in step 611, a metal layer and a via hole are formed on the second dielectric layer corresponding to the area between the first and the second common lines, with the via hole penetrating through the first dielectric layer and the second dielectric layer, so as to connect the polysilicon layer.

In step 613, a fourth dielectric layer is formed above the second dielectric layer and the metal layer. Then, in step 615, a third dielectric layer is formed on the fourth dielectric layer but only in the reflective area. Next, in step 617, a reflective electrode and a contact hole are formed on the third dielectric layer in an area between the first common line and the second common line, and a transparent electrode is formed on the second dielectric layer in an area between the second common line and the third common line. The area comprising the reflective electrode is called a reflective area, while the area comprising the transparent electrode is called a transmissive area. The reflective electrode and the transmissive electrode are connected to form a pixel electrode, while the reflective area and the transmissive area, separated by a first main slit, together form a sub-pixel. Because the third dielectric layer is formed only in the reflective area, the distinct optical path difference will result in the reflective area and the transmissive area, thus achieving the goal to adjust their optical paths to be the same.

Next, in step 619, a layer with a dielectric constant or namely a display media layer is disposed above the fourth dielectric layer, the third dielectric layer, the transparent electrode, and the reflective electrode. In step 621, an alignment element is formed at the center of respective areas, while a spacer is formed between the third dielectric layer and the common electrode at a location corresponding to the first and the third common lines. Then, in step 623, a common electrode, which has substantially a zero electric potential difference with respect to the common lines, is formed on the layer, the alignment element and the spacer.

In step 625, an overcoat and a color resist layer are formed on the common electrode. The overcoat is sandwiched between the color resist layer and the common electrode to prevent damage to the color resist layer and render its surface more flat. The color resist layer may be red, green, or blue. Each pixel comprises sub-pixels of one of these three colors respectively. However, is the colors are not limited thereto. Depending on the specific design requirements, each pixel may alternatively comprise sub-pixels of one color, two colors, four colors, five colors, six colors, seven colors, and so on. In addition to the red, green, and blue colors, the pixels may further comprise black, white (colorless), brown, magenta, jacinth, cyan, or other colors in the color coordinate system (CIE).

Next, in step 627, a black matrix is formed on the color resist layer corresponding to the position of the alignment element. Finally, in step 629, the aforesaid second substrate is formed on the black matrix and the color resist layer, thus completing a sub-pixel structure. Generally, the sub-pixels of three distinct colors form a pixel, but are not just limited thereto. Depending on the specific design requirements, each pixel may alternatively comprise sub-pixels of one color, two colors, four colors, five colors, six colors, seven colors, and so on. Furthermore, a plurality of pixels may in turn form a display panel of the second embodiment.

Next, a method for a fabricating display panel of the third embodiment will be described, wherein the display panel comprises a plurality of pixels, each of which further comprises several sub-pixels.

Figure 7A:
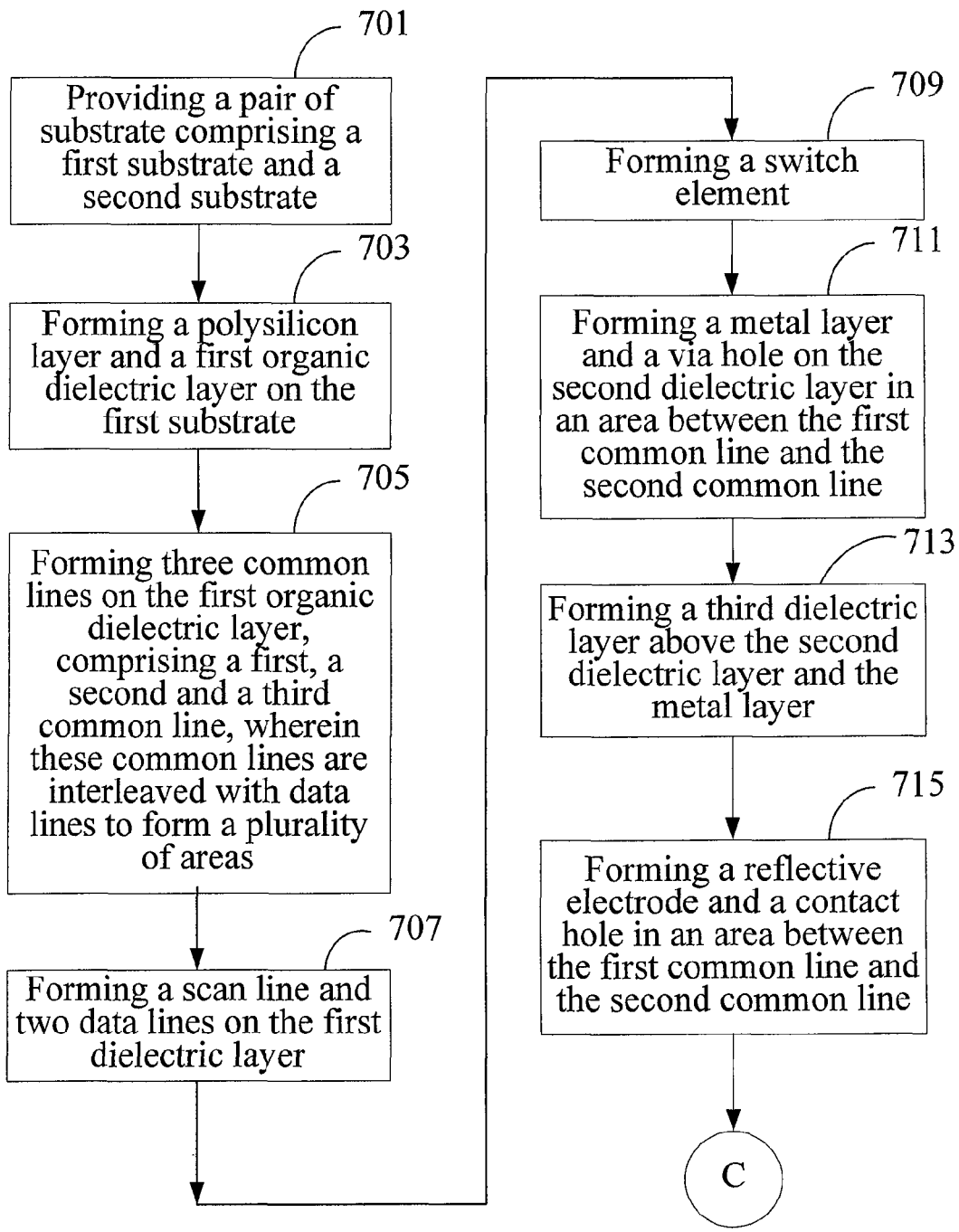
FIG. 7A is the first half of a flow diagram of a method for fabricating the third embodiment in accordance with this invention.
Figure 7B:
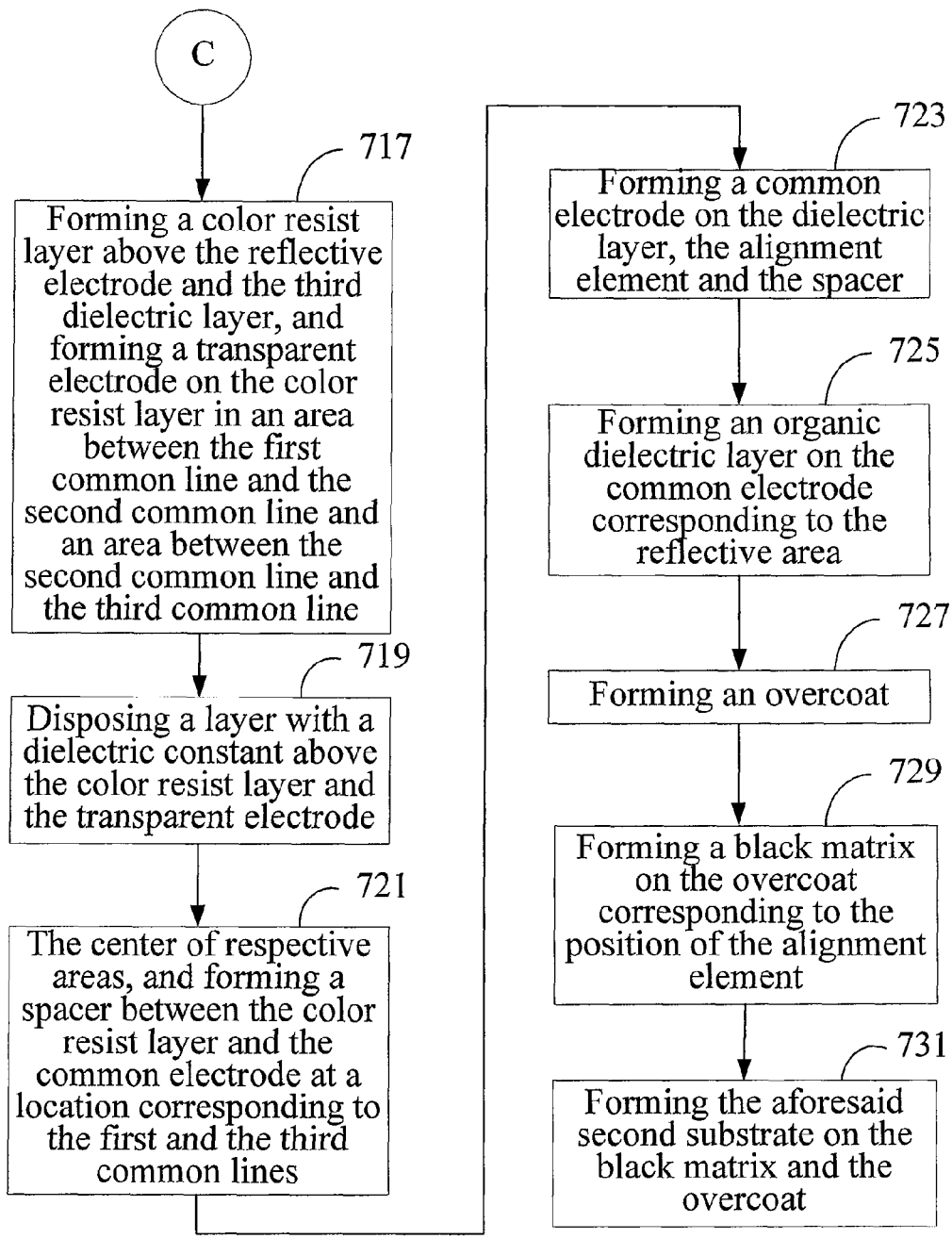
FIG. 7B is the second half of the method shown in FIG. 7A.

As shown in FIGS. 7A and 7B, the method comprises the following steps. In step 701, a pair of substrates is provided, which comprises a first substrate and a second substrate. Next, in step 703, a polysilicon layer and a first dielectric layer are formed on the first substrate, with the polysilicon layer disposed under the first dielectric layer. Then, in step 705, on the first dielectric layer are three common lines, comprising a first common line, a second common line, and a third common line, which are to be interlaced with data lines to define a plurality of areas. The second common line is preferably made of an opaque material (e.g., Au, Sn, Cu, Ag, Fe, Pb, Cd, Mo, Hf, Nd, Ti, Ta, other appropriate materials, nitrides thereof, oxides thereof, alloys thereof, or a combination thereof). In the preferred embodiments, the common lines, all have a substantially equal electric potential, are parallel to each other and perpendicular to data lines. Thereafter, a scan line and two data lines are formed on the first dielectric layer in step 707. The scan line is more adjacent to the second common line, both the scan line and the common lines are perpendicular to the data lines, and the common lines and the data lines further define a plurality of areas.

Subsequently in step 709, a switch element is formed, which has a source connected to a pixel electrode, a drain connected to a data line, and a gate connected to the scan line. During the formation of the switch element, a gate is formed under the first dielectric layer, and a source and a drain is formed on the first dielectric layer, followed by the formation of a second dielectric layer on the source and the drain. Next, in step 711, a metal layer and a via hole are formed on the second dielectric layer corresponding to the area between the first and the second common lines, with the via hole penetrating through the first dielectric layer and the second dielectric layer to adjoin the polysilicon layer.

Next, in step 713, a third dielectric layer is formed on the second dielectric layer and the metal layer. In step 715, a reflective electrode and a contact hole are formed in an area between the first common line and the second common line.

Then, in step 717, a color resist layer is formed above the reflective electrode and the third dielectric layer, and a transparent electrode is formed on the color resist layer in an area between the first common line and the second common line and an area between the second common line and the third common line. The area comprising the reflective electrode is called a reflective area, while the other area is called a transmissive area. The reflective electrode and the transmissive electrode are connected to form a pixel electrode, while the reflective area and the transmissive area, separated by a first main slit, together form a sub-pixel. The color resist layer may be either red, green, or blue. Each pixel comprises sub-pixels of these three colors respectively. However, the colors are not limited thereto. Depending on the specific design requirements, each pixel may alternatively comprise sub-pixels of one color, two colors, four colors, five colors, six colors, seven colors, and so on. In addition to the red, green, and blue colors, the pixels may further comprise black, white (colorless), brown, magenta, jacinth, cyan, or other colors in the color coordinate system (CIE).

Next, in step 719, a layer with a dielectric constant or namely display a media layer is disposed above the color resist layer and the transparent electrode. In step 721, an alignment element is formed at the center of respective areas, and a spacer is formed between the color resist layer and the common electrode at a location corresponding to the first and the third common lines. Then, in step 723, a common electrode, which has substantially a zero electric potential difference with respect to the common lines, is formed on the display media layer, the alignment element and the spacer.

In step 725, an organic dielectric layer is formed on the common electrode corresponding to the reflective area to change the optical paths of both the reflective area and the transmissive area. Then, in step 727, an overcoat is formed to make the display panel more flat.

Next, in step 729, a black matrix is formed on the overcoat corresponding to the position of the alignment element. Finally, in step 731, the aforesaid second substrate is formed on the black matrix and the overcoat, thus completing a sub-pixel structure. Generally, the sub-pixels of the three distinct colors form a pixel, but it is not just limited thereto. Depending on the specific design requirements, each pixel may alternatively comprise sub-pixels of one color, two colors, four colors, five colors, six colors, seven colors, and so on. Furthermore, a plurality of pixels in turn forms a display panel of the third embodiment.

Other implementation aspects may exist for the above methods. In more detail, a further step may be comprised to divide a transmissive area into a first sub-area and a second sub-area by a second main slit. The first sub-area is located between the reflective area and the second sub-area, while the second sub-area is located between the first sub-area and a reflective area of another sub-pixel. In the preferred embodiment, for example (but not limited thereto), the first sub-area and the second sub-area may have an area approximately equal to that of the reflective area. Other implementation aspects with more than two sub-areas in the transmissive area will readily occur to those skilled in the art.

Steps of this embodiment are not limited to the precise order described above. Additionally, apart from the aforesaid steps, steps for the forming elements included or possibly included in the previous embodiments may be further contemplated in this embodiment. Steps or actions corresponding to those of the previous embodiments may readily occur to those skilled in the art upon considering description of the previous embodiments, and therefore a detailed description thereof will be omitted herein.

Additionally, although the above embodiments of this invention are all described with reference to a polysilicon layer, this invention is not just limited thereto. Instead, the following materials may be selectively used: monocrystalline silicon, amorphous silicon, microcrystalline silicon, Ge-containing variations of the aforesaid materials, N-doped or P-doped variations of the aforesaid materials, or a combination thereof. Furthermore, although the above embodiments of this invention are all described with reference to the three common lines, this invention is not just limited thereto; instead, four, five, six, seven or another number of common lines may be used. Similarly, although the above embodiments of this invention are all described with reference to one transmissive area and one reflective area or one reflective area and two transmissive areas, this invention is not just limited thereto. Instead, there may be two reflective areas and one transmissive area, two reflective areas and two transmissive areas, one reflective area and three transmissive areas, and so on. That is, there may be "n" reflective areas and "m" transmissive areas, where "n", and "m" are positive integers larger than or equal to 1, with "m">"n" preferably. Although the spacers described in the above embodiments are disposed on the common electrode of the second substrate, this invention is not limited thereto. Instead, the spacers may be selectively formed under the common electrode of the second substrate, above/below the pixel electrodes of the first substrate, or a combination thereof. Moreover, although the spacers described in the above embodiments correspond to the common lines, this invention is not just limited thereto. Instead, the spacers may be selectively formed at locations corresponding to the scan lines, the data lines, the switch elements, intersections between the scan lines and the data lines, intersections between the data lines and the common lines, within the transmissive areas, within the reflective areas, or a combination thereof. Still further, although the above embodiments of this invention are all described with reference to two switch elements, this invention in not just limited thereto. Instead, one, three, four, five, six or another numbers of the switch elements may be selectively used. Furthermore, although the above embodiments of this invention are described with reference to the presence of both the transmissive area and the reflective area, this invention is not just limited thereto; instead, there may be only transmissive areas or only reflective areas, other possibilities, or a combination thereof. Additional, although the above embodiments of this invention are all described with reference to the TFT is a top gate structure as an exemplification, but not-limited thereto, the TFT may be a bottom gate structure or other type.

Figure 8:
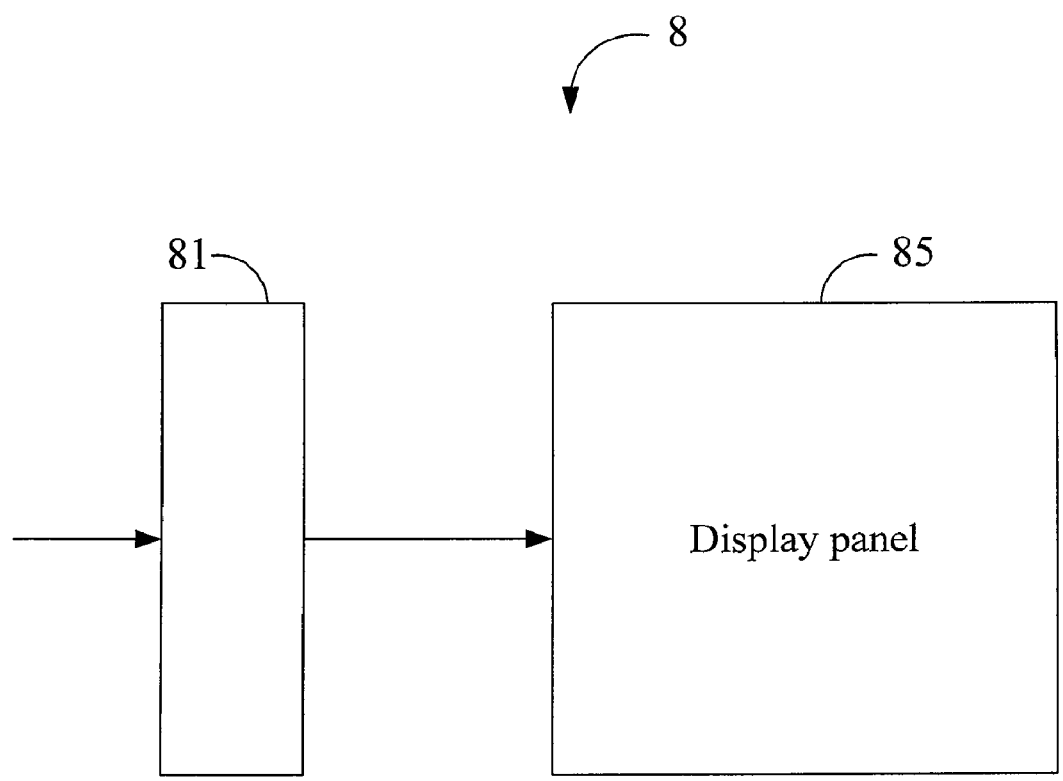
FIG. 8 illustrates an electro-optical device in accordance with this invention.

FIG. 8 depicts an electro-optical device 8 comprising a display panel described in the above embodiments. The electro-optical device 8 comprises an electronic element 81 and a display panel 85. The electro-optical device 8 may be a portable product (e.g., a handset, a video camera, a camera, a notebook type computer, a game console, a watch, a music player, an email transceiver, a map navigator, or a similar product), a video/audio product (e.g., a video/audio player or a similar product), a display screen, a TV set, a visual panel, a panel within a projector, and etc. The electronic element 8 may be a control device, an operating device, a processing device, an input device, a memory device, a driving device, a light emitting device, a protecting device, a sensing device, a detecting device, or other functional devices, or a combination thereof. The display panel 85 may be one described in one of the above embodiments and other implementation aspects thereof. By use of the aforesaid electronic elements, the display panel 85 can function properly to display an image without any dark-state light leakage.

Figure 9:
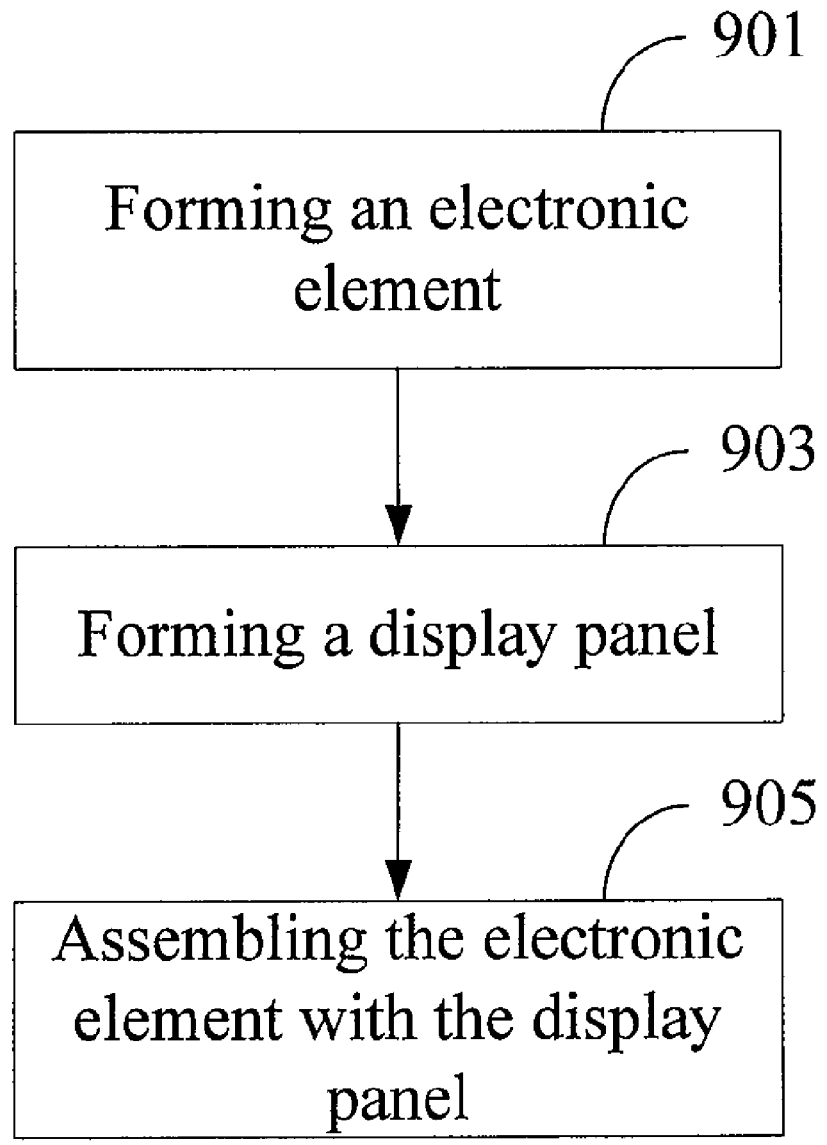
FIG. 9 is a flow diagram of a method for fabricating the electro-optical device in accordance with this invention.

FIG. 9 depicts a method for fabricating an electro-optical device of this invention. This method comprises the following steps: step 901 for forming an electronic element, step 903 for forming a display panel, and step 905 for assembling the electronic element with the display panel. Upon completion of such a fabricating process, a step for controlling the electronic element may be further performed, in order for the display panel to execute the display function.

By using a common line design which is advantageous over the prior art, this invention can improve the irregular tilt conditions of liquid crystal molecules above the scan lines, and increase the efficiency of the liquid crystal molecules. The common lines all connected to a single signal source are configured to receive the same signals as the common electrode of the second substrate, wherein both the common lines and the common electrode are at a voltage level of 0 V. Meanwhile, the scan lines arc disposed under the reflecting plate of the reflective areas. Both ends of the reflective areas are connected with the common lines so that equal electric fields will be generated at both sides, thus obtaining a consistent tilt orientation of the liquid crystal molecules at both sides. Furthermore, the intense electric field generated by the scan lines is shielded by the reflecting plate, preventing the electric field from affecting the arrangement of the liquid crystal molecules. Therefore, this invention can improve the arrangement of the liquid crystal molecules, enhance the liquid crystal efficiency, mitigate the dark-state light leakage, and increase the contrast ratio.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A display panel, comprising:
a pair of substrates comprising a first substrate and a second substrate;
at least one data line formed on the first substrate;
at least three common lines comprising a first common line, a second common line, and a third common line formed on the first substrate, the common lines interlacing with the at least one data line to form a plurality of areas, each area comprising an electrode being connected with one another electrode in another area to form a pixel electrode;
at least one scan line formed on the first substrate and disposed under the electrode of one of the areas;
at least one switch element formed under the electrode of one of the areas, comprising a source being connected to the pixel electrode, a drain being connected to the data line, and a gate being connected to the scan line;
a common electrode formed on the second substrate; and
a display media layer disposed between the pair of the substrates.

2. The display panel of claim 1, wherein the second common line is disposed at a border between the areas, and the second common line is adjacent to the scan line.

3. The display panel of claim 2, wherein the second common line and the common electrode have an electric potential difference therebetween being substantially zero.

4. The display panel of claim 1, further comprising an organic dielectric layer, being disposed on one of the pair of substrates, the organic dielectric layer being disposed correspondingly at the area having the scan line.

5. The display panel of claim 4, further comprising a color resist layer, being formed on one of the pair of substrates.

6. The display panel of claim 4, wherein the display media layer comprises a plurality of molecules, and several of the molecules near to a surface of the organic dielectric layer are substantially perpendicular to the surface.

7. The display panel of claim 6, wherein the molecules near to a surface of each substrate are substantially perpendicular to the surface of each substrate.

8. The display panel of claim 1, wherein each of the areas has a first main slit therebetween.

9. The display panel of claim 1, further comprising an alignment element being formed in the areas.

10. The display panel of claim 9, further comprising a spacer being formed on at least one substrate, such that the spacer is corresponding to at least one of the first common line and the third common line.

11. The display panel of claim 10, wherein the spacer is formed in the area having the scan line.

12. The display panel of claim 1, wherein one of the areas is a reflective area having an electrode made of a reflective material, and the others of the areas are a transmissive area having an electrode made of a transmissive material.

13. The display panel of claim 1, wherein one of the areas is a reflective area having an electrode made of a reflective material, the others of the areas are a transmissive area having an electrode made of a transmissive material, and the transmissive area comprises at least two sub-areas.

14. The display panel of claim 13, wherein each of the sub-areas has a second main slit therebetween.

15. The display panel of claim 1, wherein the common lines have a substantially same electric potential.

16. The display panel of claim 1, wherein the common lines and the common electrode have an electric potential difference therebetween being substantially zero.

17. The display panel of claim 1, further comprising a color resist layer being formed on one of the pair of substrates.

18. An electro-optical device, comprising the display panel of claim 1.

19. A method of fabricating a display panel, comprising:
providing a pair of substrates, comprising a first substrate and a second substrate;
forming at least one data line on the first substrate;
forming at least three common lines on the first substrate, the common lines comprising a first common line, a second common line, and a third common line, the common lines interlacing with the at least one data line to form a plurality of areas, each area comprising an electrode being connected with one another electrode in another area to form a pixel electrode;
forming at least one scan line on the first substrate under the electrode of one of the areas;
forming at least one switch element under the electrode of one of the areas, the at least one switch element comprising a source being connected to the pixel electrode, a drain being connected to the data line, and a gate being connected to the scan line;
forming a common electrode on the second substrate; and
disposing a display media layer between the pair of the substrates.

20. The method of claim 19, further comprising a step of forming an organic dielectric layer on one of the pair of substrates, the organic dielectric layer being disposed correspondingly at the area having the scan line.

21. The method of claim 20, further comprising a step of forming a color resist layer on one of the pair of substrates.

22. The method of claim 19, further comprising a step of forming an alignment element in the areas.

23. The method of claim 19, further comprising a step of forming a spacer on at least one substrate, such that the spacer is corresponding to at least one of the first common line and the third common line.

24. The method of claim 19, further comprising a step of forming a color resist layer on one of the pair of substrates.

25. A method of fabricating an electro-optical device, comprising the method for fabricating the display panel of claim 19.

* * * * *